(12) United States Patent
Bando et al.

(10) Patent No.: US 10,091,767 B2
(45) Date of Patent: Oct. 2, 2018

(54) COMMUNICATION APPARATUS AND COMMUNICATION METHOD

(71) Applicant: Toshiba Memory Corporation, Minato-ku (JP)

(72) Inventors: Yosuke Bando, Yokohama (JP); Hiroki Kudo, Kawasaki (JP); Masahiro Ishiyama, Kawasaki (JP); Kenichi Maeda, Kamakura (JP); Yujen Lai, Kawasaki (JP); Hiroto Nakai, Yokohama (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 101 days.

(21) Appl. No.: 15/064,919

(22) Filed: Mar. 9, 2016

(65) Prior Publication Data
US 2017/0055272 A1    Feb. 23, 2017

Related U.S. Application Data

(60) Provisional application No. 62/207,676, filed on Aug. 20, 2015.

(51) Int. Cl.
*H04W 72/08*    (2009.01)
*H04W 72/04*    (2009.01)
(Continued)

(52) U.S. Cl.
CPC ........... *H04W 72/02* (2013.01); *H04W 36/00* (2013.01); *H04W 84/20* (2013.01)

(58) Field of Classification Search
CPC ............... H04W 72/085; H04W 72/02; H04W 72/0453; H04W 88/06
See application file for complete search history.

(56) References Cited

U.S. PATENT DOCUMENTS

| | | | |
|---|---|---|---|
| 2003/0117964 A1* | 6/2003 | Chen | H04W 28/12 370/252 |
| 2005/0033816 A1* | 2/2005 | Yamaguchi | H04W 84/20 709/208 |

(Continued)

FOREIGN PATENT DOCUMENTS

| | | |
|---|---|---|
| JP | 2007-174368 | 7/2007 |
| JP | 4808202 | 11/2011 |
| WO | WO 2011/121671 A1 | 10/2011 |

*Primary Examiner* — Charles C Jiang
*Assistant Examiner* — Thad Defauw
(74) *Attorney, Agent, or Firm* — Oblon, McClelland, Maier & Neustadt, L.L.P.

(57) ABSTRACT

According to one embodiment, a communication apparatus includes an operation mode storage unit that stores a mode in which the communication apparatus operates as a wireless base station or a terminal and a non-volatile memory, wherein a transmission message is output to the outside when the communication apparatus operates as the wireless base station, data included in a received reception message is stored in the non-volatile memory when the communication apparatus operates as the terminal, and when the communication apparatus operates as the wireless base station, after all data transmitted from a first external wireless base station is received, if a communication quality with the first wireless base station is less than a predetermined value, and no message is received from a wireless base station other than the first wireless base station, a channel selection and switching process is performed, and then the operation mode is changed from the terminal to the wireless base station.

16 Claims, 19 Drawing Sheets

(51) Int. Cl.
*H04W 72/02* (2009.01)
*H04W 36/00* (2009.01)
*H04W 84/20* (2009.01)

(56) References Cited

U.S. PATENT DOCUMENTS

| | | | |
|---|---|---|---|
| 2006/0292988 A1* | 12/2006 | Yuen | H04B 17/373 455/62 |
| 2011/0019715 A1* | 1/2011 | Brisebois | H04B 7/0626 375/130 |
| 2011/0044276 A1* | 2/2011 | Albert | H04L 1/1854 370/329 |
| 2011/0243013 A1* | 10/2011 | Lee | H04W 24/10 370/252 |
| 2013/0009751 A1 | 1/2013 | Sato et al. | |
| 2014/0348124 A1* | 11/2014 | Hasegawa | H04B 1/7143 370/330 |
| 2015/0063312 A1* | 3/2015 | Vissa | H04W 36/26 370/332 |
| 2015/0327282 A1* | 11/2015 | Werner | H04W 72/085 455/450 |
| 2015/0365202 A1 | 12/2015 | Kudo et al. | |

\* cited by examiner

| WIRELESS STATION IDENTIFIER | ... |

FIG.7

| IDENTIFIER | COMMUNICA-TION QUALITY | CHANNEL | FLAG |
|---|---|---|---|
|  |  |  |  |
|  |  |  |  |
|  | ⋮ |  |  |

FIG.11
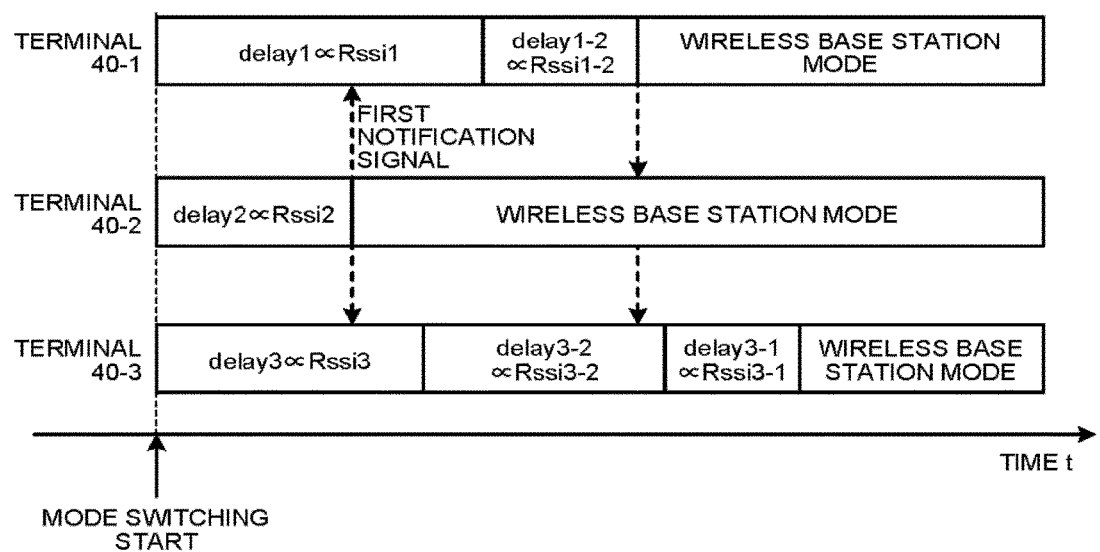
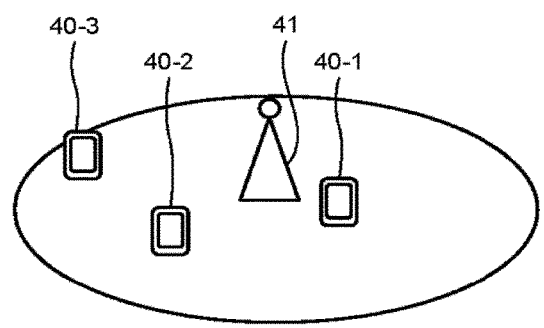
Rssi1>Rssi3>Rssi2

COMMUNICATION APPARATUS AND COMMUNICATION METHOD

CROSS-REFERENCE TO RELATED APPLICATIONS

This application is based upon and claims the benefit of priority from U.S. Provisional Application No. 62/207,676, filed on Aug. 20, 2015; the entire contents of which are incorporated herein by reference.

FIELD

Embodiments described herein relate generally to a communication apparatus and a communication method.

BACKGROUND

In wireless communication, there is a system in which terminals perform communication with each other via a wireless base station rather than directly. In this system, the wireless base station transmits a notification signal storing information for a wireless connection, and the terminal performs a connection process with the wireless base station based on the notification signal received from the wireless base station.

BRIEF DESCRIPTION OF THE DRAWINGS

FIG. 7 is a diagram illustrating an exemplary configuration of a communication quality list;

FIG. 11 is a diagram for describing standby operations of a first switching standby time and a second switching standby time;

DETAILED DESCRIPTION

In general, according to the present embodiment, a communication apparatus includes an operation mode storage unit that stores a mode in which the communication apparatus operates as a wireless base station or a terminal and a non-volatile memory. The communication apparatus outputs a transmission message to the outside when the communication apparatus operates as the wireless base station, stores data included in a received reception message in the non-volatile memory when the communication apparatus operates as the terminal, and when the communication apparatus operates as the wireless base station, after all data transmitted from a first external wireless base station is received, if a communication quality with the first wireless base station is less than a predetermined value, and no mess age is received from a wireless base station other than the first wireless base station, performs a channel selection and switching process, and then changes the operation mode from the terminal to the wireless base station. The channel selection and switching process is a process of causing the wireless interface unit to perform transmission and reception of the message through the selected frequency channel.

Exemplary embodiments of a communication apparatus and a communication method will be explained below in detail with reference to the accompanying drawings. The present invention is not limited to the following embodiments.

First Embodiment

Figure 1:
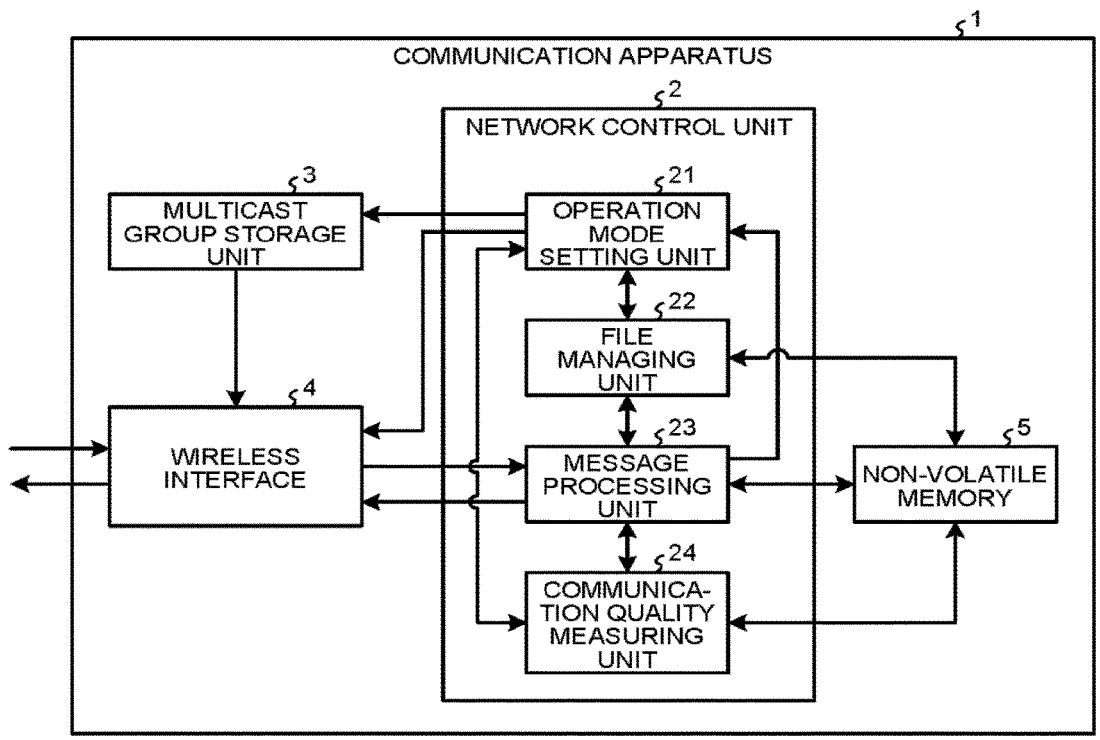
FIG. 1 is a block diagram illustrating an exemplary configuration of a communication apparatus according to an embodiment.

FIG. 1 is a block diagram illustrating an exemplary configuration of a communication apparatus 1 according to an embodiment. The communication apparatus 1 includes a network control unit 2, a multicase group storage unit 3 (an identification information storage unit), a wireless interface 4 (a wireless interface unit), and a non-volatile memory 5.

The communication apparatus 1 of the present embodiment can perform transmission and reception of data with another communication apparatus 1 having the same configuration through peer-to-peer (P2P) type communication. The communication apparatus 1 can perform unicast communication with another communication apparatus 1, and can transmit the same data to a plurality of other communication apparatuses 1 in a multicast manner.

Figure 2:
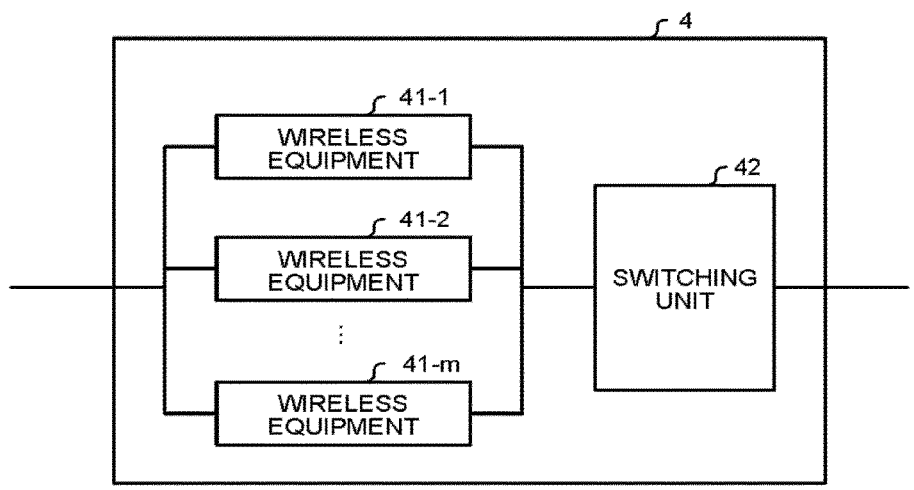
FIG. 2 is a diagram illustrating an exemplary configuration of a wireless interface including a plurality of wireless equipment.

The wireless interface 4 executes a wireless signal reception process, and when a received signal is a message addressed to its own apparatus, outputs the message to the network control unit 2, The wireless interface 4 transmits a message generated by the network control unit 2 as a wireless signal. The wireless interface 4 performs a transfer process for implementing P2P type communication by a plurality of communication apparatuses 1. There is no restriction to a protocol for implementing the P2P communication, but for example, an Internet Protocol (IP) may be used. The wireless interface 4 can support a plurality of frequency bands, that is, a plurality of frequency channels, and switches a frequency channel according to an instruction given from an operation mode setting unit 21, and performs a transmission and reception operation. Hereinafter, a frequency channel is abbreviated as a channel. The wireless interface 4 may include one wireless equipment capable of supporting a plurality of channels or may be configured to include wireless equipment 41-1 to 41-*m* (m is an integer of 2 or more) corresponding to different channels and a switching unit 42 as illustrated in FIG. 2. In the case of the configuration illustrated in FIG. 2, the switching unit 42 selects wireless equipment to be used among the wireless equipment 41-1 to 41-*m* according to an instruction given from the operation mode setting unit 21.

The multicast group storage unit 3 holds an identifier list of a multicast group to which its own apparatus in a configuratino in which a publisher (which will be described later) transmits data in a multicase manner belongs. The multicast group storage unit 3 notifies the wireless interface 4 of an identifier of a multicast group to which its own apparatus belongs. The wireless interface 4 determines that a message in which a multicast address corresponding to the identifier of the multicast group to which its own apparatus belongs is stored as a destination is addressed to its own apparatus. The non-volatile memory 5 holds data to be transmitted, received data, and the like. The network control unit 2 includes the operation mode setting unit 21, a file managing unit 22, a message processing unit 23, and a communication quality measuring unit 24.

The operation mode setting unit 21 (an operation mode storage unit) of the network control unit 2 stores information indicating whether its own apparatus is in a mode (a wireless base station mode) in which it operates as a wireless base station or in a mode (a terminal mode) in which it operates as a terminal. In the present embodiment, the terminal can function as the wireless base station, and the wireless base station can function as the terminal as well.

Further, in the configuration in which the publisher (which will be described later) transmits data in the multicast manner, the operation mode setting unit 21 sets a multicaset group to which its own apparatus belongs as well. When the wireless base station transmits data in the multicast manner as the publisher, the operation mode setting unit 21 also stores a mode in which its own apparatus is the publisher or a subscriber. In a configuration in which a file is distributed from the publisher (which will be described later) to the subscriber in the multicast manner, it is common that the publisher operates as the wireless base station, and the subscriber operates as the terminal, but the publisher may operate as the terminal, and the subscriber may operate as the wireless base station. A multicase group setting will be described later. The operation mode setting unit 21 manages a switching process from the terminal to the wireless base station and a switching process from the wireless base station to the terminal. When the communication apparatus 1 transmits data in the multicast manner as the publisher, an operation mode may be individually set for each multicast group. For example, a setting may be also performed such that one communication apparatus 1 operates as the publisher in a certain multicast group, and operates as the subscriber in another multicast group. The operation mode setting unit 21 controls the file managing unit 22 and the message processing unit 23 that execute an operation according to the operation mode for each multicast group.

The message processing unit 23 generates a message in which data to be transmitted to another communication apparatus 1 is shaped in a certain format, and transfers the generated message to the wireless interface 4. A message received from another communication apparatus 1 is received by the wireless interface 4, and a process according to content of the message is executed. When the received message is a data message storing certain data, the message processing unit 23 stores the data in the non-volatile memory 5.

Figures 3, 4:
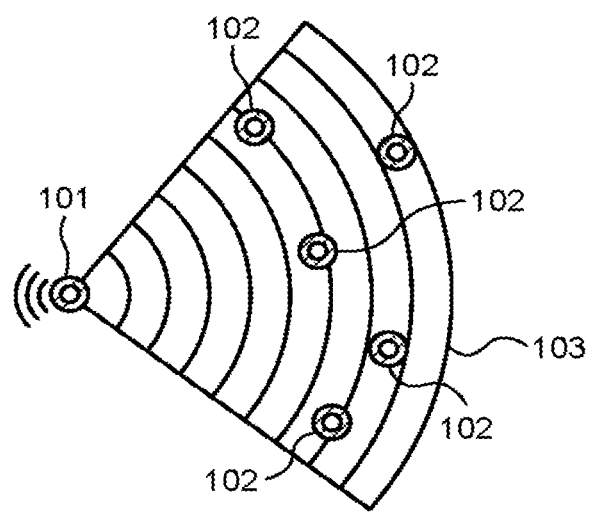
FIG. 3 is a diagram illustrating exemplary message transmission.
FIG. 4 is a diagram illustrating an exemplary configuration of a first notification signal according to an embodiment.

FIG. 3 is a diagram illustrating exemplary message transmission according to the present embodiment. An example in which a wireless base station 101 (the communication apparatus 1 operating as the wireless base station) transmits data message storing certain data in the multicast manner is illustrated. A terminal 102 positioned within an arrival range 103 of a radio wave from the wireless base station 101 can receive the data message. The radio wave output from the wireless base station 101/the terminal 102 may have or may not have directivity. When the radio wave has no directivity, in FIG. 3, the radio wave output from the wireless base station 101/the terminal 102 is concentrically propagated in free space.

FIG. 4 is a diagram illustrating an exemplary configuration of a first notification signal according to the present embodiment. The first notification signal is a notification signal transmitted from the wireless base station, and stores a wireless station identifier serving as an identifier related to a wireless connection of the wireless base station, for example, as illustrated in FIG. 4. For example, a service set identifier (SSID) in a wireless local area network (LAN) or the like may be used as the wireless station identifier. The first notification signal may include other information than the wireless station identifier. There is no restriction to the configuration of the first notification signal, for example, a beacon frame in the wireless LAN may be used as the first notification signal.

Figure 5:
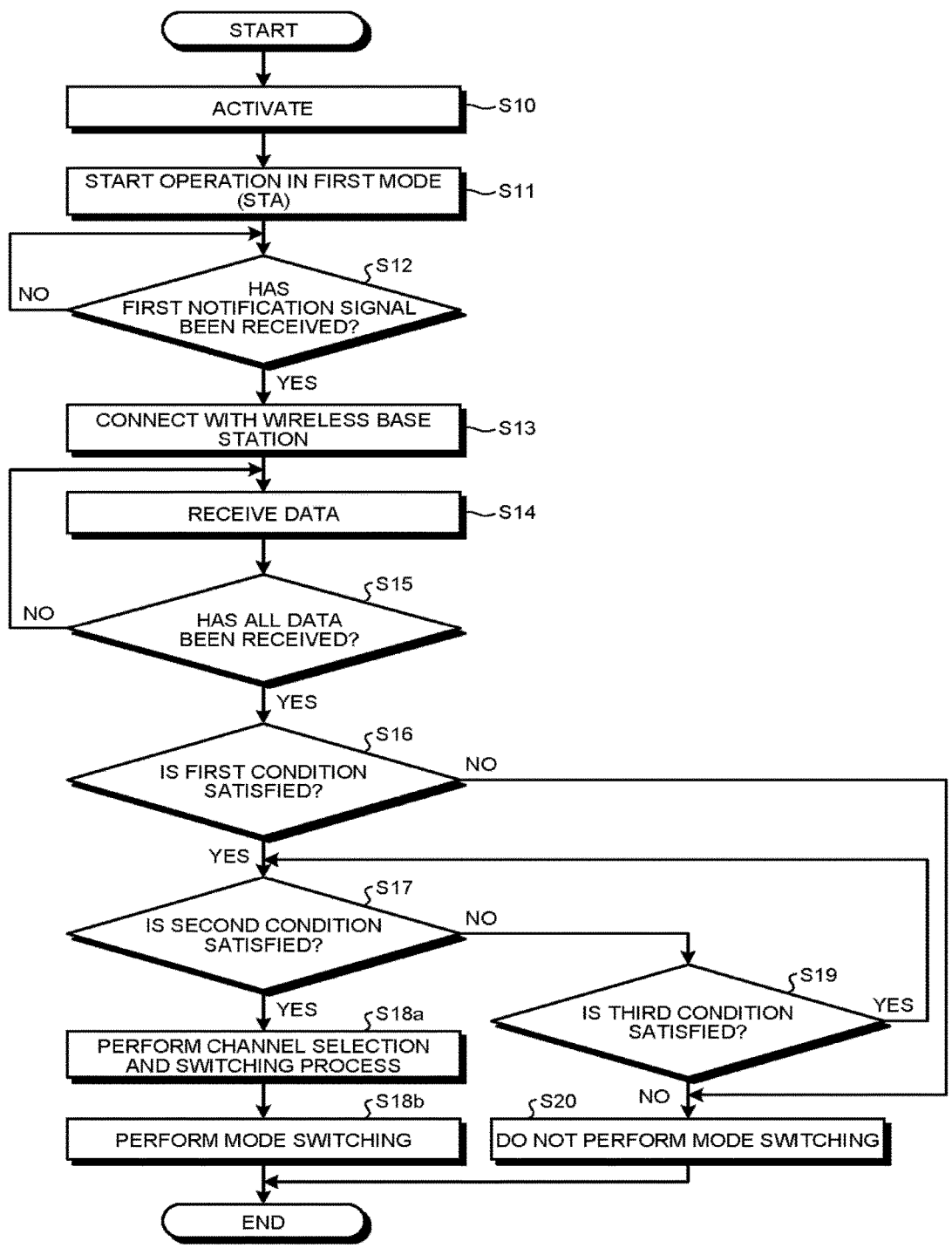
FIG. 5 is a diagram illustrating an exemplary process of state transition from a terminal mode to a wireless base station mode.

FIG. 5 is a diagram illustrating an exemplary process performed when the communication apparatus in the mode in which it operates as the terminal (station (STA)) of the present invention performs state transition to the mode in which it operates as the wireless base station (access point (AP)). As illustrated in FIG. 5, when activated (step S10), the communication apparatus starts an operation in the mode in which it operates as the terminal step (S11). Then, it is determined whether or not the first notification signal has been received from the wireless base station (step S12), and when received (Yes in step S12), the communication apparatus is connected with the wireless base station (step S13). When the first notification signal has not been received (No in step S12), step S12 is repeated.

The communication apparatus 1 in the mode in which it operates as the terminal connected with the wireless base station receives certain data (step S14). Then, it is determined whether or not all data has been received in the communication apparatus 1 (step S15). Specifically, in the case of the configuration in which the file is distributed from the publisher to the subscriber in the multicast manner, the file managing unit 22 determines whether all files (files that are likely to be distributed from the publisher) corresponding to table of contents (ToC) are held or all data has been consequently received based on ToC information (content information) reported through a second notification signal (which will be described later). When all data has been received, the communication apparatus 1 starts switching from the mode in which it operates as the terminal to the mode in which it operates as the wireless base station.

As a condition in which all data is determined to have been received, in the configuration in which the file is distributed from the publisher to the subscriber in the multicast manner, a method of determining whether or not all corresponding files are held based on the ToC information as described above is the most effective method in the present invention. It may be determined whether or not all data has been received using a situation in which data has been received by a certain number of times although any of all files has not been received or an elapsed time from a time at which reception starts as a trigger. Further, reception of control data for notifying of the fact that all data has been received may be used as a trigger.

In the above method, a condition determination is performed in a process of the network layer or the higher layer of the open systems interconnection (OSI) reference model, but when the communication apparatus operates as the wireless base station and the terminal, the number of receptions of the first notification signal in the data link layer or an elapsed time from a time at which reception starts may be used as a trigger.

When all data has not been received (No in step S15), the process returns to step S14. When all data has been received (Yes in step S15), the operation mode setting unit 21 determines whether or not a first condition has been satisfied (step S16). The first condition will be described later. When the first condition is satisfied (Yes in step S16), the operation mode setting unit 21 determines whether or not a second condition is satisfied (step S17). The second condition will be described later. When the second condition is satisfied (Yes in step S17), a channel selection and switching process is performed (step S18a), and mode switching is performed (step S18b). The channel selection and switching process is a process of selecting a channel used for delivery of data (delivery of a file) and performing switching to the selected channel, and the details will be described later. When the second condition is not satisfied (No in step S17), it is determined whether or not a third condition is satisfied (step S19), and when the third condition is satisfied (Yes in step S19), the process returns to step S17.

When the first condition is not satisfied in step S16 (No in step S16), the process ends without mode switching (step S20). When the third condition is not satisfied in step S19 (No in step S19), the process proceeds to step S20.

Figure 6:
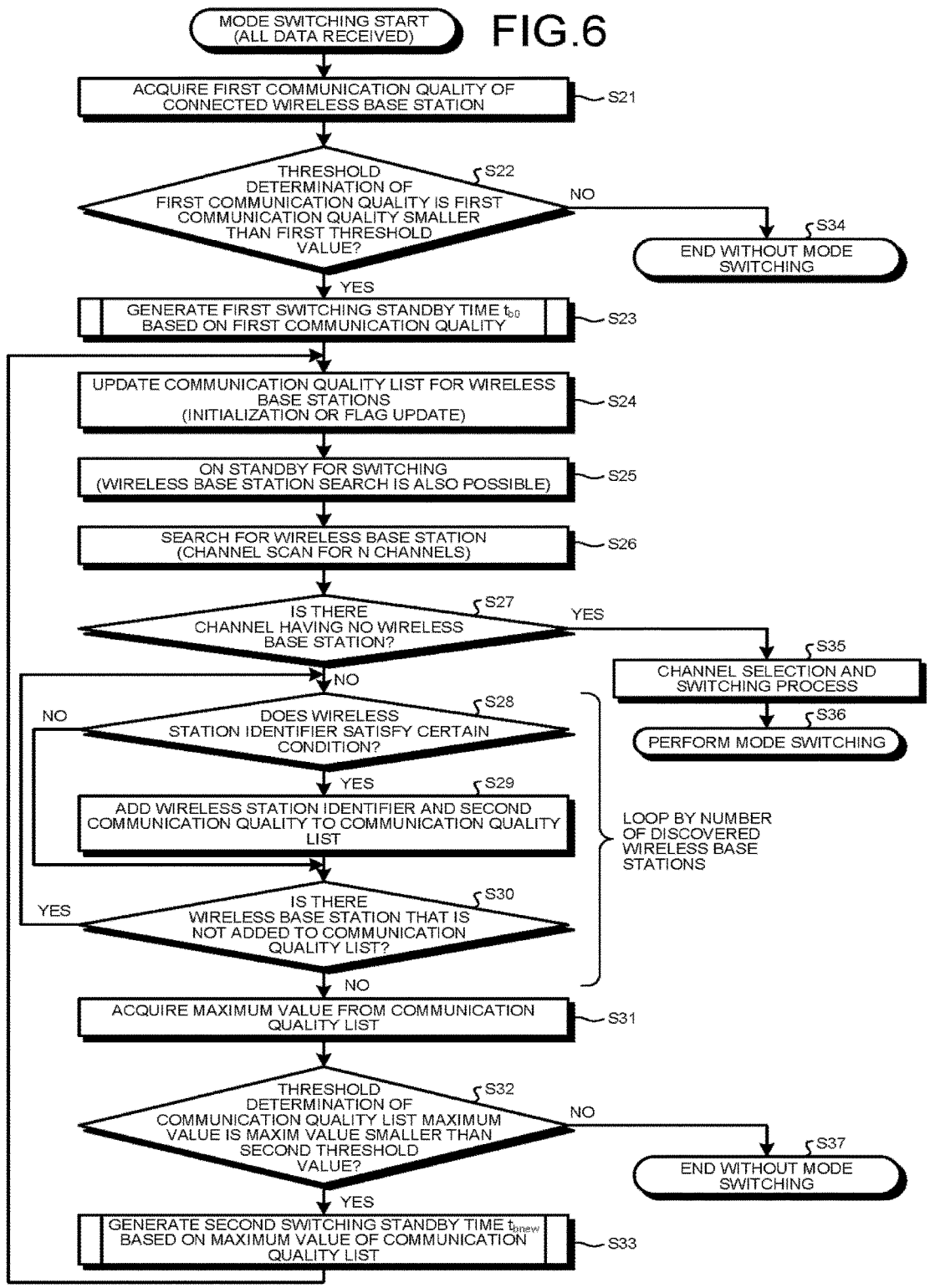
FIG. 6 is a flowchart illustrating an exemplary mode switching determination process.

Next, specific examples of the first condition and the second condition will be described. FIG. 6 is a flowchart illustrating an exemplary mode switching determination process. The mode switching determination process is a process corresponding to a subsequent process including step S16 performed when Yes is determined in step S15 of FIG. 5. The communication apparatus 1 in the mode in which it operates as the terminal starts the mode switching determination process when all data has been received. First, the communication quality measuring unit 24 acquires a communication quality (hereinafter, referred to as a "first communication quality") with the wireless base station based on a signal received from the wireless base station connected thereto (step S21). An index such as a received signal strength indication (RSSI), reception power of a wireless signal, a signal to noise power ratio, a communication quality indicator, or a packet error rate may be used as the communication quality. Hereinafter, an index in which the communication quality gets betters as a numerical value increases is assumed to be used. When an index in which the communication quality gets worse as a numerical value increases is used, a direction of an inequality sign in threshold determination related to a communication quality (which will be described later) is reversed. Instead of performing step S21, the first communication quality that is acquired and held when connected with the wireless base station may be used in a process of step S22 which will be described later.

Then, the operation mode setting unit 21 determines whether or not the first communication quality is smaller than a first threshold value (step S22). A condition as to whether or not the first communication quality is smaller than the first threshold value is the first condition. When the first communication quality is equal to or larger than the first threshold value (No in step S22), the process ends without transitioning to the mode in which it operates as the wireless base station (step S34). Commonly, when the communication apparatus is close to the wireless base station to connect, the first communication quality is also good. In the present embodiment, the terminal that is determined to be close to the wireless base station by determination using the first threshold value does not transition to the wireless base station.

When the first communication quality is less than the first threshold value (Yes in step S22), a first switching standby time $t_{b0}$ based on the first communication quality is generated (step S23). A method of generating the first switching standby time will be described later. Then, the operation mode setting unit 21 updates a communication quality list of the wireless base station (step S24). The update of the communication quality list will be described later. The communication quality list is a list for storing a communication quality (hereinafter, referred to as a "second communication quality") with the wireless base station other than the wireless base station being connected for each wireless base station and each channel. FIG. 7 is a diagram illustrating an exemplary configuration of the communication quality list. As illustrated in FIG. 7, the communication quality list includes the wireless station identifier (for example, a BSSID of the wireless base station), the second communication quality (for example, RSSI) (which will be described later), a channel (a channel index), and a flag. The details of the flag will be described later, but the flag indicates whether information of an entry is one when the entry was added to the communication quality list or one updated after the entry was added. In the present embodiment, a channel index is decided for each channel in advance as information for identifying a channel. Hereinafter, appropriately, a wireless base station being connected is referred to as a "first wireless base station," and a wireless base station other than the first wireless base station is referred to as a "second wireless base station."

Then, the operation mode setting unit 21 is on standby for switching during the switching standby time (step S25). When step S25 is performed after performing step S33 which will be described later, a second switching standby time which will be described later is used as the switching standby time. When step S25 is performed without performing step S33 which will be described later, the first switching standby time is used as the switching standby time. Then, the operation mode setting unit 21 instructs the communication quality measuring unit 24 to performs a search (channel scan) for a wireless base station using a channel for each channel for N channels in a channel index order, and the communication quality measuring unit 24 searches for the wireless base station (step S26). Specifically, the communication quality measuring unit 24 determines whether or not it is possible to receive the first notification signal transmitted from the wireless base station other than the first wireless base station for each channel, and when it is possible to receive, acquires the wireless station identifier and the second communication quality of the wireless base station (the second wireless base station) of the transmission source based on the first notification signal. N is an integer satisfying $N<N_{max}$ when the number of available channels is $N_{max}$. As described above, in the present embodiment, it is possible to reduce a time required for a search by searching for some channels instead of searching for all available channels. For example, it is desirable to decide N in advance by a simulation or the like so that interference with a surrounding wireless base station does not occur. For example, N is set to 4. A value of N is not limited to this example. In the present embodiment, channel indices are decided in advance for N channels as described above. A correspondence between an index and a channel (a frequency band) may be any correspondence. Further, during the standby operation in step S25, the search for the wireless base station in step S26 may be executed. As a correspondence method of a channel and an index, for example, various methods such as a method of deciding a correspondence between a channel and an index using a certain random number, a method of arranging in an ascending order starting from a low frequency, or a method of arranging in a descending order starting from a radio frequency, or the like may be employed.

The operation mode setting unit 21 determines whether or not there is a channel having no second wireless base station based on the wireless base station search result (step S27). Specifically, the operation mode setting unit 21 determines whether or not there is a channel having no second wireless base station. A condition in which there is a channel having no second wireless base station in step S27 (Yes in step S27) is the second condition. When there is no second wireless base station (Yes in step S27), the channel selection and switching process is executed (step S35). Thereafter, the operation mode setting unit 21 switches the mode (step S36). In other words, transition to the operation mode of the wireless base station is performed.

When there is no channel having no second wireless base station (No in step S27), it is determined whether or not the wireless station identifier of the second wireless base station satisfies a certain condition (step S28). The certain condition is decided in advance and held in the operation mode setting unit 21. Further, a condition in which the first notification signal from the second wireless base station has been received in none of channels as the channel scan result may be used as a condition in which there is determined to be no channel having no second wireless base station (No in step S27). In other words, Yes is determined in step S27 when there is one channel in which the first notification signal from the second wireless base station has been received. The communication quality measuring unit 24 measures the second communication quality of the first notification signal, and when the second communication quality of the first notification signal is less than a certain threshold value (a third threshold value), that is, when the communication quality is remarkably bad, the first notification signal may be determined to have not been received. As a result, even in a situation in which there are many second wireless base stations, it is possible to reduce influence of the second wireless base station that is at a very long distance. The certain threshold value (the third threshold value) is smaller than the first and second threshold values.

A setting of the wireless station identifier according to the present embodiment is now described. In the present embodiment, in the configuration in which the file is distributed from the publisher to the subscriber in the multicast manner, the wireless station identifier preferably satisfies the following (a) and (b):

(a) It is possible to identify the communication apparatus 1 capable of performing file delivery and reception using a multicast group. Hereinafter, the communication apparatus 1 capable of performing file delivery and reception using a multicast group is abbreviated as the communication apparatus 1 capable of participating in a group.

(b) It is a value specific to each communication apparatus 1 among the communication apparatuses 1 capable of performing file delivery and reception using a multicast group.

In the present embodiment, a first allocation method of allocating one identifier satisfying both (a) and (b) to the communication apparatus 1 or a second allocation method of allocating two identifiers, that is, a first identifier satisfying (a) and a second identifier satisfying (b) to the communication apparatus 1 is used. In the case of the first allocation method, for example, for the communication apparatuses 1 capable of participating in the group, the same fixed value is set as upper 1 or more bits of the wireless station identifier as identification bits, and a value specific to each communication apparatus 1 are set as bits other than the fixed value. In the case of the second allocation method, for example, for the communication apparatuses 1 capable of participating in the group, the same fixed value is set as the first identifier, and a value specific to each communication apparatus 1 is set as the second identifier. A specific example of the wireless station identifier will be described later. The wireless station identifier is included in the first notification signal.

The determination as to whether or not the wireless station identifier of the second wireless base station satisfies a certain condition in step S28 is determination as to whether the communication apparatus 1 is the communication apparatus 1 capable of participating in the group. Thus, when the wireless station identifier is allocated by the first allocation method, in step S28, it is determined whether or not the identification bit is identical to a fixed value that is decided in advance. When the wireless station identifier is allocated by the second allocation method, in step S28, it is determined whether or not the first identifier is identical to a fixed value that is decided in advance.

Referring back to FIG. 6, when the wireless station identifier satisfies the certain condition (Yes in step S28), the operation mode setting unit 21 adds the channel, the wireless station identifier, the second communication quality corresponding to the wireless station identifier, and the flag to the communication quality list (step S29). Specifically, when there is no entry having a channel and a wireless station identifier that are identical with the communication quality list, a new entry is added. When there is an entry having a channel and a wireless station identifier that are identical within the communication quality list, the second communication quality of the entry is updated. The flag has a value for determining two values, that is, True and False, and has False as an initial value. Then, the operation mode setting unit 21 determines whether or not there is a second wireless base station that is not stored in the communication quality list (step S30). When there is a second wireless base station that is not stored in the communication quality list (Yes in step S30), the process returns to step S28, and the subsequent process including step S28 is performed on a second wireless base station that is not stored in the communication quality list.

When there is no second wireless base station that is not stored in the communication quality list (No in step S30), the operation mode setting unit 21 acquires a maximum value of the second communication quality from the communication quality list (step S31). At this time, when the flag associated with the wireless station identifier in the communication quality list is True, the second communication quality of the wireless station identifier is exempted in the process of acquiring the maximum value of the second communication quality. Then, the operation mode setting unit 21 determines whether or not the maximum value of the second communication quality is smaller than the second threshold value (step S32). A condition as to whether or not the maximum value of the second communication quality is smaller than the second threshold value is the third condition. The second threshold value is smaller than the first threshold value.

When the maximum value of the second communication quality is equal to or larger than the second threshold value (No in step S32), the process ends without transitioning to the operation mode of the wireless base station (step S37). When the maximum value of the second communication quality is smaller than the second threshold value (Yes in step S32), the second switching standby time $t_{bnew}$ is generated based on the maximum value of the second communication quality (step S33), and the process returns to step S24. Further, when the wireless station identifier does not satisfy the certain condition (No in step S28), the process proceeds to step S30.

When the process returns from step S33 to step S24, in step S24, the communication quality list is updated. In the update of the communication quality list, either initialization of the communication quality list or the update of the flag is performed. The update of the flag refers to a process of changing all flags of the communication quality list to True. The initialization of the communication quality list refers to a process of deleting all entries (one entry is configured with the wireless station identifier, the communication quality (the second communication quality), the channel, and the flag) within the communication quality list.

When the process transitions from step S23 to step S24, the initialization of the communication quality list is performed. When the process transitions from step S33 to step S24, either the update of the flag or the initialization of the communication quality list is performed. For example, the flag is commonly updated, but the initialization of the communication quality list may be executed when a certain period of time elapses after the initialization of the previous communication quality list is executed or when the initialization of the communication quality list has not been performed a certain number of times consecutively. Thus, when the second wireless base station has moved or disappeared, the terminal that is performing the mode switching can switch the operation mode to a new second wireless base station. Further, a configuration that performs only the initialization of the communication quality list without performing the update of the flag is also possible. Thus, particularly, in the use case in which the second wireless base station frequently moves, it is possible to propagate appropriately.

Through the above process, when the first condition is satisfied (Yes in step S22) and the second condition is satisfied (Yes in step S27) or when in the condition in which the first condition is satisfied (Yes in step S22) and the second condition is not satisfied (No in step S27), the third condition is satisfied (Yes in step S32), the loop process returning to the second condition comparison is performed again, and then the second condition is satisfied (Yes in step S27), the terminal performs the channel selection and switching process, and then switches the mode to the wireless base station. The channel selection and switching process is a process of selecting one of two or more frequency channels and causing the wireless interface 4 to perform transmission and reception of a message through the selected frequency channel as described above. Further, in the above process, when the first condition is satisfied, the standby is performed during the first switching standby time, and then the second condition determination process is performed, but the second condition determination process may be performed without being on standby or after being on standby during an arbitrary period of time. Further, in the above process, when the first condition is satisfied, the second condition is not satisfied, and the third condition is satisfied, after being on standby during the second switching standby time, the second condition determination is performed on the second wireless base station that has not undergone the second condition determination. In this case, the second condition determination may be performed on the next second wireless base station without being on standby during the second switching standby time, or the second condition determination process may be performed no the second wireless base station after being on standby during an arbitrary period of time.

Figure 8:
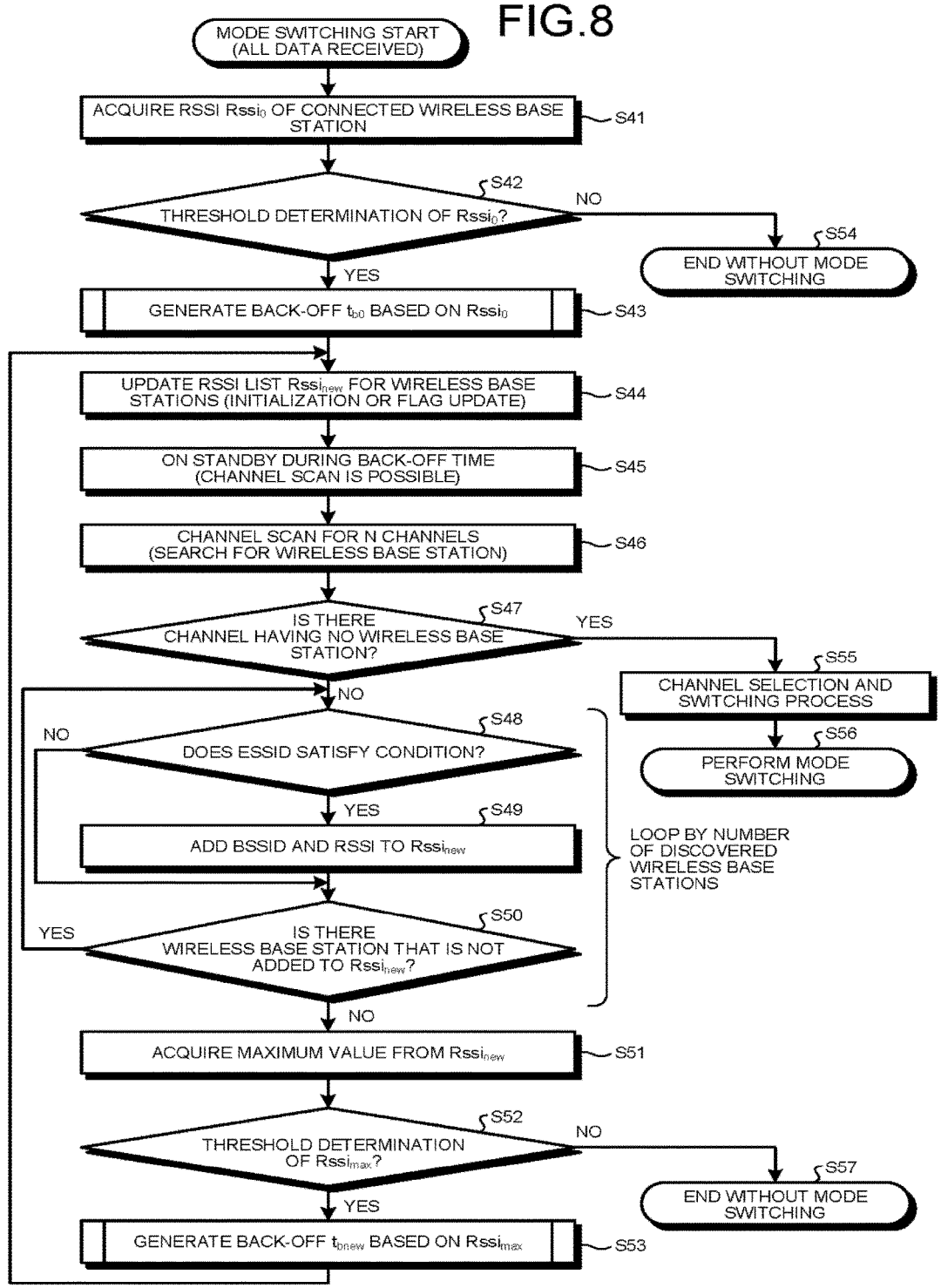
FIG. 8 is a diagram illustrating an exemplary mode switching process to a wire base station according to IEEE 802.11.

Next, a specific example in which a process of FIG. 8 is applied to a wireless LAN system conforming to Institute of Electrical and Electronic Engineers (IEEE) 802.11 will be described. FIG. 8 is a diagram illustrating an exemplary operation mode switching process to the wireless base station in the case of conforming to IEEE 802.11. Steps S41, S42, . . . , and S57 of FIG. 8 correspond to steps S21, S22, . . . , and S37 of FIG. 6.

Similarly to the example of FIG. 6, the communication apparatus 1 determined to have received all data starts a mode switching determination process. First, the communication quality measuring unit 24 acquires an RSSI ($Rssi_0$) based on a signal received from the wireless base station (the first wireless base station) being connected as the first communication quality (step S41). Then, the operation mode setting unit 21 determines whether or not $Rssi_0$ is smaller than the first threshold value $Rssi_{new\_th1}$ (step S42). When $Rssi_0$ is equal to or larger than $Rssi_{new\_th1}$ (No in step S42), the process ends without switching the mode to the wireless base station (step S54).

When $Rssi_0$ is less than $Rssi_{new\_th1}$ (Yes in step S42), a back-off (the first switching standby time) $t_{b0}$ based on $Rssi_0$ is generated (step S43). Then, the operation mode setting unit 21 updates an RSSI list $Rssi_{new}$ of the wireless base station (step S44). The RSSI list $Rssi_{new}$ is a specific example of the communication quality list of the example of FIG. 7. The RSSI list $Rssi_{new}$ includes the BSSID, the RSSI, channel (channel index) and the flag. The update of the RSSI list $Rssi_{new}$ will be described later.

Then, the operation mode setting unit 21 is on standby for switching during the back-off time (step S45). Similarly to the example of FIG. 6, when step S45 is executed after performing step S53 which will be described later, $t_{bnew}$ which will be described later is used as the back-off time. When step S45 is performed without performing step S53 which will be described later, $t_{b0}$ is used as the back-off time. Then, the operation mode setting unit 21 instructs the communication quality measuring unit 24 to perform a search (channel scan) for the wireless base station using the channel for each channel for N channels in a channel index order, and the communication quality measuring unit 24 searches for the wireless base station (step S46). Specifically, the communication quality measuring unit 24 acquires the RSSI serving as the second communication quality and the SSID (an ESSID and a BSSID) based on the beacon frame transmitted from the second wireless base station for each channel. The channel scan of step S46 may be executed during the standby operation in step S45.

The operation mode setting unit 21 determines whether or not there is a channel having no second wireless base station based on the wireless base station search result (step S47). Specifically, the operation mode setting unit 21 determines whether or not there is a channel having no second wireless base station. When there is no second wireless base station (Yes in step S47), the channel selection and switching process is executed (step S55). Thereafter, the operation mode setting unit 21 switches the mode (step S56). In other words, transition to the operation mode of the wireless base station is performed.

When there is no channel having no second wireless base station (No in step S47), it is determined whether or not the ESSID of the second wireless base station satisfies a certain condition (step S48). Here, for the communication apparatuses 1 capable of participating in the group, the same fixed value is assumed to be set as the ESSID. Thus, in step S48, it is determined whether or not the ESSID is identical to the fixed value. A condition in which the beacon frame from the second wireless base station has been received in none of channels as the channel scan result may be used as a condition in which it is determined that there is the second wireless base station (No in step S47). In other words, Yes is determined in step S47 when there is one channel in which the first notification signal from the second wireless base station has been received. The communication quality measuring unit 24 measures the RSSI of the beacon frame, and when the RSSI of the beacon frame is equal to or less than a certain threshold value (the third threshold value), that is, when the communication quality is remarkably bad, the beacon frame may be determined to have not been received. As a result, even in a situation in which there are many second wireless base stations, it is possible to reduce influence of the second wireless base station that is at a very long distance. The certain threshold value (the third threshold value) is smaller than the first and second threshold values.

The ESSID is a 48-bit address that can be freely changed by the user, and the BSSID is a 48-bit address specific to the communication apparatus. Thus, the ESSID is used as the first identifier, and the BSSID is used as the second identifier. However, the embodiments are not limited thereto, and for example, the same fixed value may be set as a bit of a certain position within the ESSID, and a value specific to the communication apparatus may be set as other bits within the ESSID. Further, the same fixed value may be set as a bit of a certain position within the BSSID, and a value specific to the communication apparatus may be set as other bits within the BSSID. For example, a method of generating a random number or the like is considered as a method of deciding a value specific to the communication apparatus.

Referring back to FIG. 8, when the ESSID of the second wireless base station satisfies the certain condition (Yes in step S48), the operation mode setting unit 21 adds the BSSID of the second wireless base station and the RSSI corresponding to the BSSID, and the flag to the RSSI list $Rssi_{new}$ (step S49). Specifically, when there is no entry having a channel and a BSSID that are identical within the RSSI list $Rssi_{new}$, a new entry is added. When there is an entry having a channel and a BSSID that are identical within the RSSI list $Rssi_{new}$, the second communication quality of the entry is updated. The flag is similar to the example of FIG. 6. Then, the operation mode setting unit 21 determines whether or not there is a second wireless base station that is not stored in $Rssi_{new}$ (step S50). When there is a second wireless base station that is not stored in $Rssi_{new}$ (Yes in step S50), the process returns to step S48, and the subsequent process including step S48 is performed on a second wireless base station that is not stored in $Rssi_{new}$.

When there is no second wireless base station that is not stored in $Rssi_{new}$ (No in step S50), the operation mode setting unit 21 acquires the maximum value of the RSSI from $Rssi_{new}$ (step S51). At this time, when the flag associated with the SSID in the communication quality list is True, the RSSI of the SSID is exempted in the process of acquiring the maximum value of $Rssi_{new}$. Then, the operation mode setting unit 21 determines whether or not the maximum value of the RSSI is smaller than the second threshold value $Rssi_{new\_th2}$ (step S52). $Rssi_{new\_th2}$ is smaller than $Rssi_{new\_th1}$.

When the maximum value of the RSSI is equal to or larger than $Rssi_{new\_th2}$ (No in step S52), the process ends without performing the mode switching (step S57). When the maximum value of the RSSI is smaller than $Rssi_{new\_th2}$ (Yes in step S52), the back-off time $t_{bnew}$ serving as the second switching standby time is generated based on the maximum value of the RSSI (step S53), and the process returns to step S44. Further, when the ESSID of the second wireless base station does not satisfy the certain condition (No in step S48), the process proceeds to step S50.

When the process returns from step S53 to step S44, in step S44, the RSSI list $Rssi_{new}$ is updated. In the update of the RSSI list $Rssi_{new}$, either initialization of the RSSI list $Rssi_{new}$ or the update of the flag is performed. The update of the flag refers to a process of changing all flags of the RSSI list $Rssi_{new}$ to True. The initialization of the RSSI list $Rssi_{new}$ refers to a process of deleting the SSID, the RSSI, and the flag within the RSSI list $Rssi_{new}$.

When the process transitions from step S43 to step S44, the initialization of the RSSI list $Rssi_{new}$ is performed. When the process transitions from step S53 to step S44, either the update of the flag or the initialization of the RSSI list $Rssi_{new}$ is performed. For example, the flag is commonly updated, but the initialization of the RSSI list $Rssi_{new}$ may be executed when a certain period of time elapses after the initialization of the previous RSSI list $Rssi_{new}$ is executed or when the initialization of the RSSI list $Rssi_{new}$ has not been performed a certain number of times consecutively. Thus, when the second wireless base station has moved or disappeared, the terminal that is performing the mode switching can switch the operation mode to a new second wireless base station. Further, a configuration that performs only the initialization of the RSSI list $Rssi_{new}$ without performing the update of the flag is also possible. Thus, particularly, in the use case in which the second wireless base station frequently moves, it is possible to propagate appropriately.

Through the above process, similarly to the example of FIG. 6, when the first condition is satisfied (Yes in step S42) and the second condition is satisfied (Yes in step S47) or when in the condition in which the first condition is satisfied (Yes in step S42) and the second condition is not satisfied (No in step S47), the third condition is satisfied (Yes in step S52), the loop process returning to the second condition comparison is performed again, and then the second condition is satisfied (Yes in step S47), the terminal switches the mode to the wireless base station.

Figure 9:
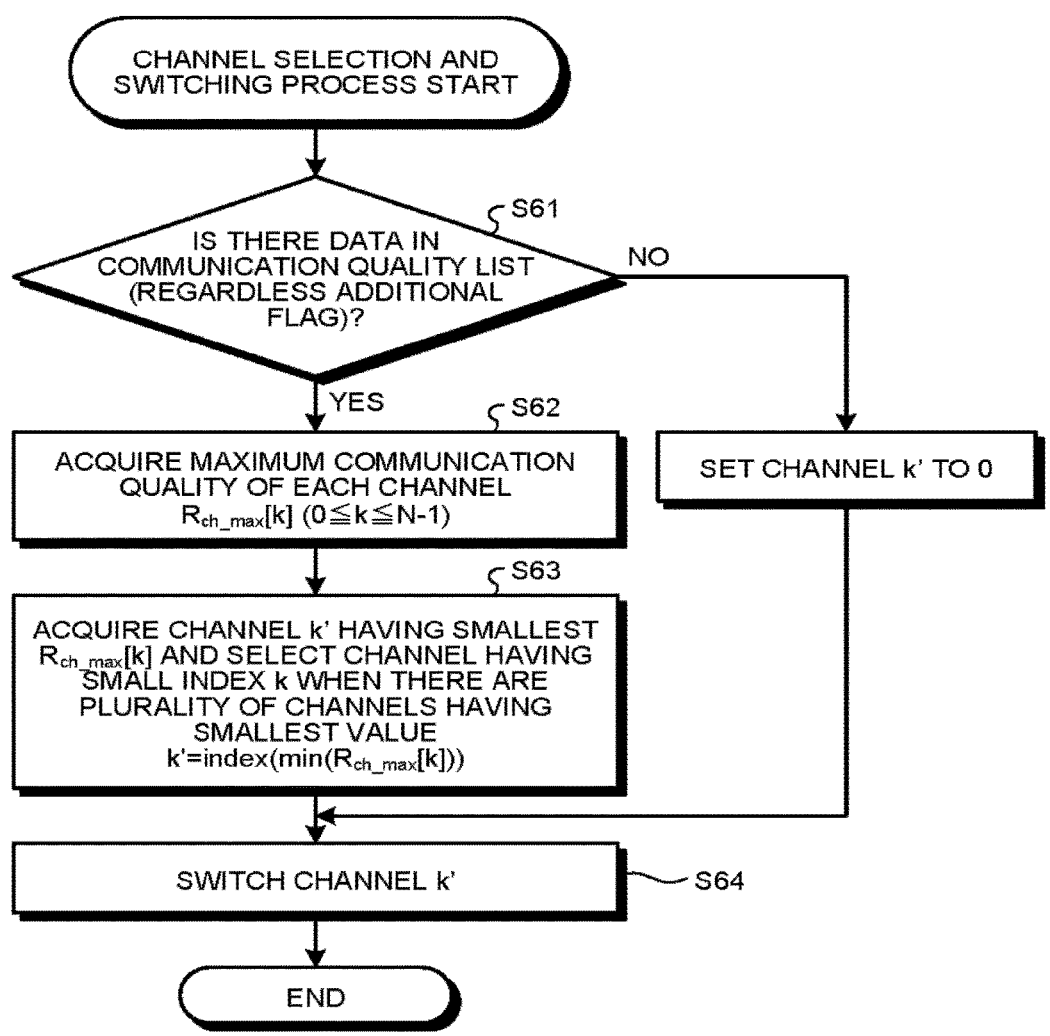
FIG. 9 is a flowchart illustrating an exemplary channel selection and switching process according to the present embodiment.

Next, the channel selection and switching process (steps S18a, S35, and S55 illustrated in FIGS. 5, 6, and 8) according to the present embodiment will be described. FIG. 9 is a flowchart illustrating an exemplary channel selection and switching process according to the present embodiment. Here, N channel indices serving a channel scan target are assumed to consecutive integers of 0 to (N−1).

First, the operation mode setting unit 21 determines whether or not there is data (an entry) in the communication quality list (step S61). At this time, regardless of the flag of the entry stored in the communication quality list, that is, regardless of whether the flag is set to True or False, when there is an entry in the communication quality list, it is determined that there is data. When there is data in the communication quality list (Yes in step S61), the operation mode setting unit 21 acquires the maximum communication quality of each channel based on the data stored in the communication quality list (step S62). Specifically, the operation mode setting unit 21 obtains a maximum communication quality $R_{ch\_max}[k]$ of a channel having an index k when k=0, 1, . . . , and (N−1). At this time, when there is a channel in which no signal has been detected by the channel scan, that is, when there is a channel in which no data is stored in the communication quality list, the operation mode setting unit 21 sets a smallest value within a range which the communication quality can have, that is, a value indicating the worst communication quality as the maximum communication quality $R_{ch\_max}[k]$ of the channel.

Then, the operation mode setting unit 21 acquires a channel index k' in which the maximum communication quality $R_{ch\_max}[k]$ has the smallest value among the maximum communication qualities $R_{ch\_max}[k]$ (k=0, 1, . . . , and (N−1)) acquired in step S62 (step S63). When there are a plurality of channels in which the maximum communication quality $R_{ch\_max}[k]$ has the smallest value, a small index is indicated by k'. In other words, when min( ) is a function indicating a smallest value of a value of ( ), and index( ) is a function for acquiring an index corresponding to a value in ( ), k' is calculated by k'=index(min($R_{ch\_max}[k]$)). Then, the operation mode setting unit 21 instructs the wireless interface 4 to switch the channel to a channel corresponding to k', the wireless interface 4 switches the channel according to the instruction (step S64), and the channel selection and switching process ends. After the channel selection and switching process ends, the mode switching is performed as described above. The second communication quality stored in the communication quality list corresponds to strength of a signal transmitted from another communication apparatus, that is, strength of a signal serving as an interference signal. Thus, when the channel in which the maximum communication quality $R_{ch\_max}[k]$ has the smallest value is selected, a signal having a small interference signal is selected.

When there is determined to be no data in the communication quality list in step S61 (No in step S61), the operation mode setting unit 21 sets k'=0 (step S65), and the process proceeds to step S64. Through the above process, the maximum communication quality is calculated for each channel, the channel in which the maximum communication quality is smallest is calculated, and switching to the channel in which the maximum communication quality is smallest is performed. In the flow illustrated in FIG. 8, when the channel selection and switching process is performed, the communication quality list corresponds to the RSSI list $Rssi_{new}$, and the communication quality corresponds to the RSSI.

In the above example, when the communication qualities are equal, a small channel index is preferentially selected, but a method of setting a priority for selection is not limited to this method. For example, a priority for selection may be decided separately from the channel index, and the channel may be selected according to the priority. For example, information indicating a priority order such as the order of the channel indices 3, 1, 2, . . . may be held in the operation mode setting unit 21 as priority information, and a channel after switching may be preferentially selected in this order. In other words, when the communication qualities are equal, the operation mode setting unit 21 selects a channel after switching according to an order that is decided in advance.

Next, exemplary channel switching when a plurality of communication apparatuses 1 switch the operation mode from the terminal mode to the wireless base station mode by the above-mentioned process will be described. FIGS. 10A to 10F are diagram illustrating exemplary channel switching when there are a plurality of communication apparatuses 1. A communication apparatus 100 illustrated in FIGS. 10A to 10F is the communication apparatus 1 that has the wireless base station mode as the operation mode, and performs data delivery, that is, operates as the publisher. Circles having numerical values therein in FIGS. 10A to 10F indicate the communication apparatuses 1 that operate in the terminal mode. Each of the communication apparatuses 1 indicated by the circles having numerical values therein is assumed to satisfy the first condition and the second condition, perform the mode switching process, and perform the mode switching. The numerical values in the circles are assumed to indicate an order in which the operation mode is switched from the terminal mode to the wireless base station mode. Hereinafter, among the communication apparatuses 1 indicated by the circles in FIGS. 10A to 10F, a communication apparatus that performs the mode switching from the terminal mode to the wireless base station mode i-th is referred to as an "i-th communication apparatus 1." In FIGS. 10A to 10F, a position of each communication apparatus 1 on a plane of paper substantially corresponds to a geographical position of each communication apparatus 1. For example, a 1-st communication apparatus 1 is at a distance close to a 7-th communication apparatus 1, and at a distance far from a 17-th communication apparatus 1.

Figure 10A:
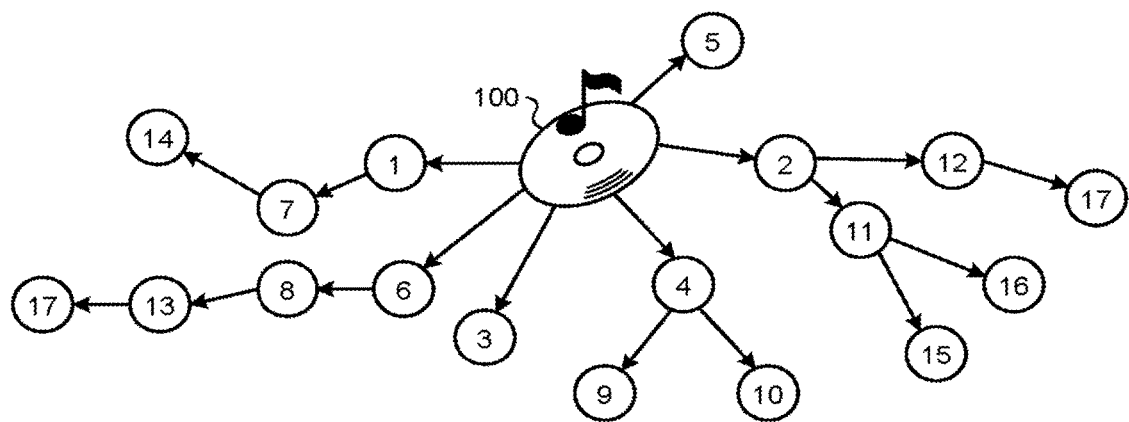
FIGS. 10A to 10F are diagrams illustrating exemplary channel switching when there are a plurality of communication apparatuses.
Figure 10B:
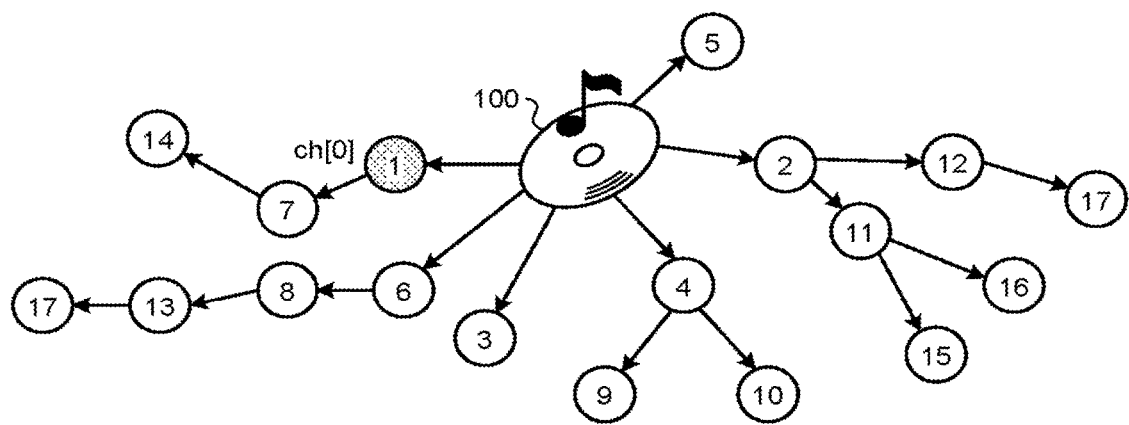
Figure 10C:
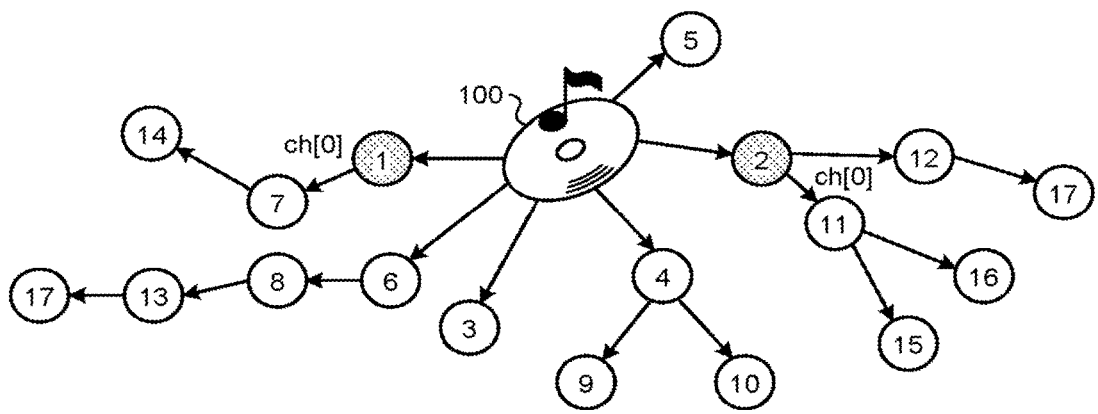

First, in a state illustrated in FIG. 10A, all the communication apparatuses 1 indicated by circles are in the terminal mode. Then, as illustrated in FIG. 10B, the 1-st communication apparatus 1 switches the channel to a channel ch[0] having the smallest index, then performs the mode switching to the wireless base station mode, and start data transmission through ch[0]. ch[k] indicates a channel corresponding to an index k. Then, as illustrated in FIG. 10C, a 2-nd communication apparatus 1 starts data transmission through ch[0]. Before the 2-nd communication apparatus 1 switches from the terminal mode to the wireless base station mode, the 1-st communication apparatus 1 uses ch[0], but in this example, since the 1-st communication apparatus 1 and the 2-nd communication apparatus 1 are far from each other, a signal transmitted from the 1-st communication apparatus 1 is not observed in the 2-nd communication apparatus 1. Thus, the 2-nd communication apparatus 1 switches the channel to ch[0].

Figure 10D:
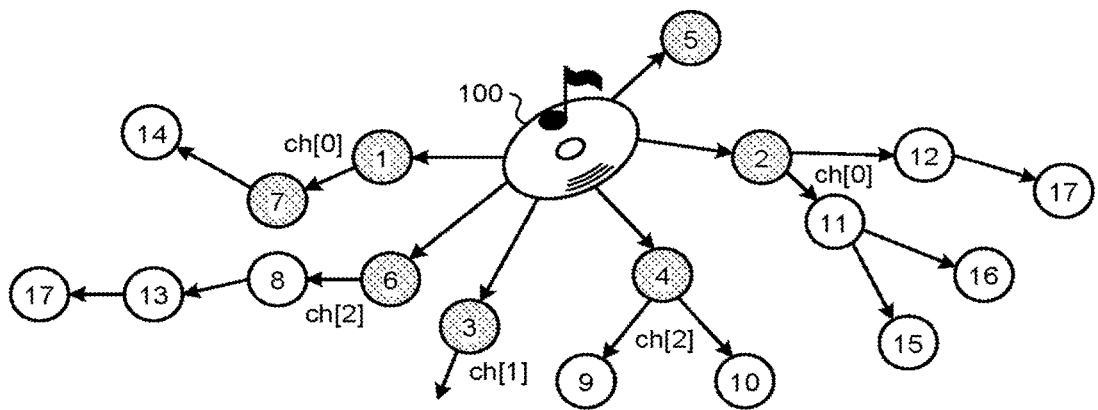

Then, as illustrated in FIG. 10D, 3-rd, 4-th, 5-th, and 6-th communication apparatuses 1 sequentially switch the operation mode. The 3-rd communication apparatus 1 detects the signal transmitted from the 1-st communication apparatus 1. Thus, the 3-rd communication apparatus 1 does not use ch[0], switches the channel to the channel ch[1] having the smallest index among the channels excluding ch[0], then performs the mode switching to the wireless base station mode, and starts data transmission through ch[1]. The 4-th communication apparatus 1 detects the signals transmitted from the 2-nd communication apparatus 1 and the 3-rd communication apparatus 1. Thus, the 4-th communication apparatus 1 does not use ch[0] and ch[1], switches the channel to the channel ch[2] having the smallest index among the channels excluding ch[0] and ch[1], then performs the mode switching to the wireless base station mode, and starts data transmission through ch[2].

The 5-th communication apparatus 1 detects the signal transmitted from the 2-nd communication apparatus 1. Thus, the 5-th communication apparatus 1 does not use ch[0], switches the channel to the channel ch[1] having the smallest index among the channels excluding ch[0], then performs the mode switching to the wireless base station mode, and starts data transmission through ch[1]. In FIG. 10D, the channel used by the 5-th communication apparatus 1 is not indicated. The 6-th communication apparatus 1 detects the signals transmitted from the 1-st communication apparatus 1 and the 3-rd communication apparatus 1. Thus, the 6-th communication apparatus 1 does not use ch[0] and ch[1], switches the channel to the channel ch[2] having the smallest index among the channels excluding ch[0] and ch[1], then performs the mode switching to the wireless base station mode, and starts data transmission through ch[2]. As described above, the channels are used in the ascending order of the indices such as ch[0], ch[1], and ch[2].

Figure 10E:
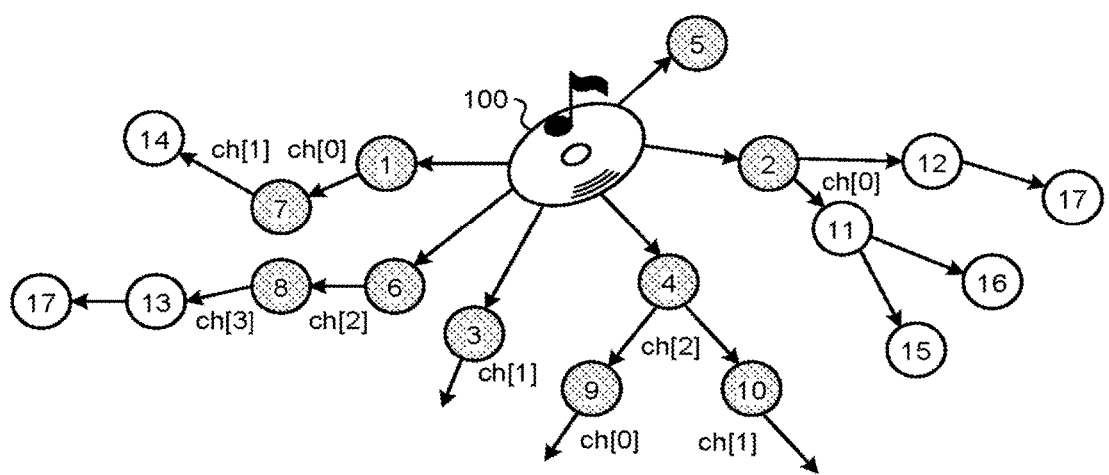

Then, as illustrated in FIG. 10E, 7-th, 8-th, 9-th, and 10-th communication apparatuses 1 sequentially switch the operation mode. The 7-rd communication apparatus 1 detects the signal transmitted from the 1-st communication apparatus 1. Thus, the 7-th communication apparatus 1 does not use ch[0], switches the channel to the channel ch[1] having the smallest index among the channels excluding ch[0], then performs the mode switching to the wireless base station mode, and starts data transmission through ch[1]. The 8-th communication apparatus 1 detects the signals transmitted from the 1-st, 7-th, and 6-th communication apparatuses 1. Thus, the 8-th communication apparatus 1 does not use ch[0], ch[1], and ch[2], switches the channel to the channel ch[3] having the smallest index among the channels excluding ch[0], ch[1], and ch[2], then performs the mode switching to the wireless base station mode, and starts data transmission through ch[3]. The 9-th communication apparatus 1 detects the signals transmitted from the 3-th and 4-th communication apparatuses 1. Thus, the 9-th communication apparatus 1 does not use ch[1] and ch[2], switches the channel to the channel ch[0] having the smallest index among the channels excluding ch[1] and ch[2], then performs the mode switching to the wireless base station mode, and starts data transmission through ch[0]. The 10-th communication apparatus 1 detects the signals transmitted from the 4-th and 9-th communication apparatuses 1. Thus, the 10-th communication apparatus 1 does not use ch[0] and ch[2], switches the channel to the channel ch[1] having the smallest index among the channels excluding ch[0] and ch[2], then performs the mode switching to the wireless base station mode, and starts data transmission through ch[1].

Figure 10F:
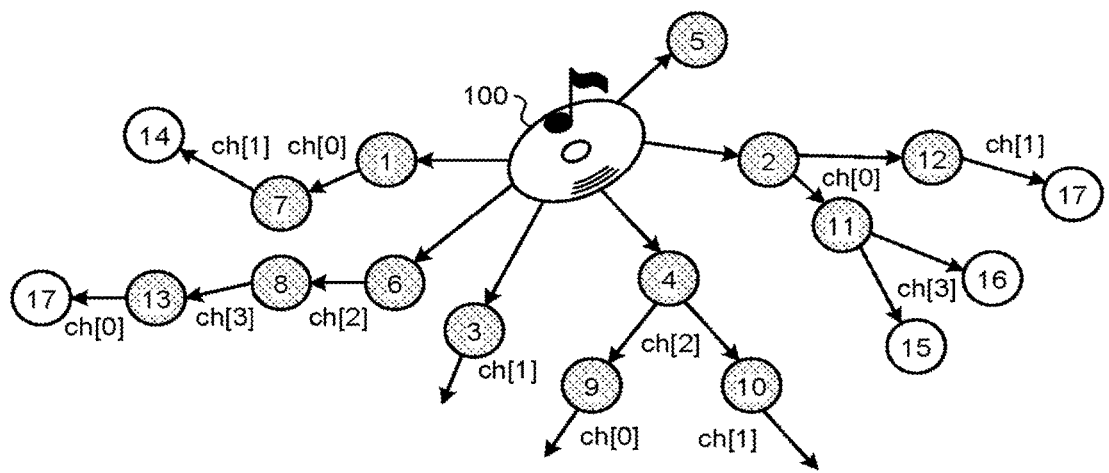

Then, as illustrated in FIG. 10F, 11-th, 12-th, and 13-th communication apparatuses 1 sequentially switch the operation mode. The 11-st communication apparatus 1 detects the signals transmitted from the 2-nd, 4-th, and 10-th communication apparatuses 1. Thus, the 11-st communication apparatus 1 does not use ch[0], ch[1], and ch[2], switches the channel to the channel ch[3] having the smallest index among the channels excluding ch[0], ch[1], and ch[2], then performs the mode switching to the wireless base station mode, and starts data transmission through ch[3]. The 12-th communication apparatus 1 detects the signals transmitted from the 2-nd and 11-st communication apparatuses 1. Thus, the 12-th communication apparatus 1 does not use ch[0] and ch[3], switches the channel to the channel ch[1] having the smallest index among the channels excluding ch[0] and ch[3], then performs the mode switching to the wireless base station mode, and starts data transmission through ch[1]. The 13-th communication apparatus 1 detects the signals transmitted from the 7-th and 8-th communication apparatuses 1. Thus, the 12-st communication apparatus 1 does not use ch[1] and ch[3], switches the channel to the channel ch[0] having the smallest index among the channels excluding ch[1] and ch[3], then performs the mode switching to the wireless base station mode, and starts data transmission through ch[0].

As described above, the different channels are initially used in the order of ch[0], ch[1], and ch[2], but the communication apparatus 1 far from the communication apparatus 1 using ch[0] uses ch[0] again. As described above, since the communication apparatuses 1 that are far from each other, that is, the communication apparatuses 1 in which the signal transmitted from the other part does not function as the interference signal use the same channel, it is possible to prevent interference using a limited number of channels. Thus, when the number of channels actually necessary for preventing interference is used as the number N of channels on which the channel scan is performed, it is possible to reduce a period of time necessary for the channel scan compared to when the channel scan is performed on all available channels.

Next, the first switching standby time and the second switching standby time will be described. The first switching standby time is generated based on the first communication quality. At this time, the first switching standby time is generated such that as the first communication quality decreases, the first switching standby time decreases. As a result, the operation mode switching of the terminal far from the wireless base station is preferentially performed.

There are three methods of calculating the first switching standby time as follows. The method of calculating the first switching standby time is not limited to this example, and a combination of two of the following three methods may be used, or a calculating method rather than the following methods may be used.

Method 1

The first communication quality is delimited into a plurality of ranges, a table in which the first switching standby time is associated with each range is held, and the first switching standby time is generated with reference to the table. An exemplary table is as follows.

RSSI<−100 dB: first switching standby time=1 second
−100 dB<=RSSI<−90 dB: first switching standby time=2 seconds
−90 dB<=RSSI<−80 dB: first switching standby time=3 seconds
−80 dB<=RSSI<−70 dB: first switching standby time=4 seconds
−70 dB<=RSSI<−60 dB: first switching standby time=5 seconds
−60 dB<=RSSI: first switching standby time=6 seconds Method 2

The first switching standby time is calculated by multiplying a weighted coefficient by the first communication quality.

For example, the first switching standby time is generated by the following Formula (1), (2), or (3). $\alpha$ is an adjustment coefficient, time_slot is a certain duration, and INT( ) is a function that performs conversion to an integer. The following Formulas (1), (2), and (3) are primary expressions related to the RSSI but not limited to the primary expression, and may be a calculation formula that monotonically increases with respect to the first communication quality.

$$\text{first switching standby time} = \text{RSSI} * \alpha \quad (1)$$

$$\text{first switching standby time} = \text{RSSI} * \alpha * \text{time\_slot} \quad (2)$$

$$\text{first switching standby time} = \text{INT}(\text{RSSI} * \alpha) * \text{time\_slot} \quad (3)$$

Method 3

A random number depending on the first communication quality is generated, and the first switching standby time is calculated.

Example 1

A random number Rand is generated in a range of Rand_min to Rand_max and weighted by the RSSI. For example, the random number is generated by the following Formula (4) or (5).

$$\text{first switching standby time} = \text{RSSI} * \alpha * \text{Rand} \quad (4)$$

$$\text{first switching standby time} = \text{RSSI} * \alpha * \text{Rand} * \text{time\_slot} \quad (5)$$

Example 2

The range of Rand_min to Rand_max in which the random number Rand can be obtained is weighted by the RSSI.

When a value range of the RSSI is assumed to be Rssi_min to Rssi_max, for example, Rand_rssi is calculated using the following Formula (6), the first switching standby time is generated by Formula (7), (8), or (9) using $\text{Rand}_{13}$ rssi, Rand_min, and Rand_max. The following Formula (6) is the primary expression of the RSSI but not limited to the primary expression as long as it is a function that monotonically increases with respect to the RSSI. $\beta$ is a constant between 0 and 1.

$$\text{Rand\_Rssi} = (\text{Rand\_max} - \text{Rand\_min})/(\text{Rssi\_max} - \text{Rssi\_min}) * (\text{RSSI} * - \text{Rssi\_min}) \quad (6)$$

$$\text{first switching standby time} = \text{RAND}(\text{Rand\_min}, \text{Rand\_rssi}) \quad (7)$$

$$\text{first switching standby time} = \text{RAND}(\text{Rand\_rssi}, \text{Rand\_max}) \quad (8)$$

$$\text{first switching standby time} = \text{RAND}(\text{Rand\_rssi} * \beta, \text{Rand\_rssi}) \quad (9)$$

The second switching standby time is generated such that as the second communication quality decreases, the second switching standby time decreases, similarly to the first switching standby time.

FIG. 11 is a diagram for describing the standby operation of the first switching standby time and the second switching standby time. As illustrated in FIG. 11, data reception by a wireless base station 41 is completed, and there are three terminals (terminals 40-1, 40-2, and 40-3) that are performing the operation mode switching. An RSSI acquired by the terminal 40-1 based on a signal transmitted from the wireless base station 41 is assumed to be Rssi1, and RSSI acquired by the terminal 40-2 based on a signal transmitted from the wireless base station 41 is assumed to be Rssi2, and an RSSI acquired by the terminal 40-3 based on a signal transmitted from the wireless base station 41 is assumed to be Rssi3.

In FIG. 11, delay1 is the first switching standby time of the terminal 40-1, delay2 is the first switching standby time of the terminal 40-2, and delay3 is the first switching standby time of the terminal 40-3. The terminals 40-1, 40-2, and 40-3 enter a data satisfaction state at the same time, and search for the wireless base station after a lapse of delay1, delay2, and delay3, respectively. In this example, since Rssi1>Rssi3>Rssi2, the terminal 40-2 initially starts to search for the wireless base station. At this point in time, since there is no any other communication apparatus 1 that has switched the operation mode to the wireless base station, the terminal 40-2 switches the operation mode to the wireless base station. When the operation mode is switched to the wireless base station, the terminal 40-2 transmits the first notification signal.

The terminals 40-1 and 40-3 search for the wireless base station after delay1 and delay3, respectively, and obtain the second communication quality based on the signal received from the terminal 40-2 that has switched the operation mode to the wireless base station. At this point in time, the maximum values of the second communication qualities in the terminals 40-1 and 40-3 are assumed to be equal to or larger than the second threshold value, and the terminals 40-1 and 40-3 generates the second switching standby time based on the second communication qualities. Here, the second communication quality obtained by the terminal 40-1 based on the signal received from the terminal 40-2 that has switched the operation mode to the wireless base station is assumed to be Rssi1-2. The second communication quality obtained by the terminal 40-2 that has switched the operation mode to the wireless base station is assumed to be Rssi3-2. The terminals 40-1 and 40-3 generate the second switching standby times delay1-2 and delay3-2 based on Rssi1-2 and Rssi3-2, respectively.

delay1+delay1-2 is assumed to be smaller than delay3+delay3-2, the terminal 40-1 is assumed to perform the search for the wireless base station after the standby operation of delay1-2, and the maximum value of the second communication quality is assumed to be less than the second threshold value. In this case, the terminal 40-1 switches the operation mode to the wireless base station, and transmits the first notification signal. The second communication quality obtained by the terminal 40-3 based on the signal received from the terminal 40-1 that has performed the mode switching to the wireless base station is assumed to be Rssi3-1. At this point in time, in the terminal 40-3, the maximum value of the second communication quality is assumed to be Rssi3-1, and Rssi3-1 is assumed to be equal to or larger than the second threshold value. The terminal 40-3 generates delay3-1 based on Rssi3-1, and performs the search for the wireless base station after the standby operation of delay3-1. Then, when the maximum value of the second communication quality is less than the second threshold value, the terminal 40-3 switches the operation mode to the wireless base station.

In the present embodiment, as described above, it is determined whether or not the terminal autonomously switches the operation mode to the wireless base station based on the communication quality. Thus, the terminal need not obtain permission of the operation mode switching from the wireless base station being connected, and can perform the mode switching to the wireless base station rapidly when the condition is satisfied. Further, in the present embodiment, the search for the wireless base station starts after the first and second switching standby times elapse, but the search for the wireless base station may be performed during the first and second switching standby operations. In this case, it is possible to switch the operation mode to the wireless base station through the second condition and the third condition immediately after the switching standby time elapses, and it is possible to reduce a delay time required for the search for the wireless base station after the switching standby time elapses.

Next, an operation in which the communication apparatus 1 operating as the terminal of the present embodiment, that is, the terminal mode is connected with the communication apparatus 1 operating as the wireless base station, that is, the wireless base station mode will be described. First, the terminal performs the channel scan for N channels in the non-connection state with the wireless base station, similarly to step S26 of FIG. 6. Then, the operation mode setting unit 21 calculates the maximum value among the communication qualities obtained by the channel scan for N channels. Then, the operation mode setting unit 21 selects the wireless base station corresponding to the maximum value among the communication qualities as the wireless base station to be connected. The operation mode setting unit 21 controls the wireless interface 4 such that the connection process with the wireless base station is performed based on the first notification signal received from the selected wireless base station. As a result, the connection process is performed between the terminal and the wireless base station having the largest communication quality. Thus, when the terminal can receive data from a plurality of wireless base stations, it is possible to receive delivery of data from the wireless base station having the good communication quality. When the connection process is performed, if the wireless base station as the publisher, and the terminal is the subscriber, data is delivered from the wireless base station to the terminal.

Next, an example in which the communication apparatuses 1 of the present embodiment configure a system in which a file is distributed from the publisher to the subscriber in the multicast manner will be described.

In the configuration in which the file is distributed from the publisher to the subscriber in the multicast manner, a configuration in which the publisher operates as the wireless base station, and the subscriber operates as the terminal is common, but the publisher may operate as the terminal, and the subscriber may operate as the wireless base station.

In data exchange between mobile equipment, there are cases in which it is necessary to transmit the same data to a plurality of terminals. In this case, data transfer is performed in a one-to-many manner. If the communication efficiency is not considered, one-to-one communication is considered to be repeated by the number of receiving terminals. However, it is redundant to repeatedly transmit the same data, a time necessary for transfer increases, and a frequency band is unnecessarily occupied for a long time.

In order to avoid this, it is desirable to use one-to-many multicast-communication rather than one-to-one unicast communication. In the present embodiment, when the same data is transmitted to a plurality of other communication apparatuses 1, transmission and reception of data is managed using a multicast group. The multicast group is a set of communication apparatuses 1 that belong to the same logical network and are in a relation of data transmission and reception. In the present embodiment, the logical network is configured with a plurality of communication apparatuses having the same multicast identifier. In other words, transmission and reception of data delivered in the multicast group is not performed between the communication apparatuses having no same multicast identifier, and transmission and reception of data delivered in the multicast group is not performed between the communication apparatuses having no same multicast identifier even if the communication apparatuses are physically close to each other. In the present embodiment, when the same data is transmitted to a plurality of other communication apparatus 1, a communication apparatus 1 serving as a transmission source of data, that is, a transmission source apparatus is referred to as a "publisher (transmission source)," and the other communication apparatus 1 than the publisher is referred to as a "subscriber (reception side)." The subscriber receives data from the publisher directly or via another communication apparatus 1. For one multicast group, one or more communication apparatuses 1 are set as the publisher.

When the communication apparatus 1 operates as the publisher, the file managing unit 22 of the communication apparatus 1 generates a ToC of a group of files to be transmitted to the subscriber. In the ToC, a file identifier is included for each file. Further, when a file is divided and transmitted, identification information of divisional data configuring a file is included in the ToC. In the present embodiment, a bundle of data transmitted from the publisher to the subscriber is referred to as a "file." The file may be any type of data file. For example, the file may be a text file or may be an image or video data file. The publisher transmits one or more files through a series of messages. Before transmitting a series of messages, the file managing unit 22 generates a ToC in which information related to a file corresponding to a series of messages is stored. When the communication apparatus 1 operates as the publisher, the file managing unit 22 generates one or more ToC(s), and generates an identifier (ID) of a held ToC as ToC information (ToC Info). The message processing unit 23 generates a message (a ToC message) in which the ToC information is stored without change or in a compressed state. For example, a bloom filter of an ID of a ToC may be used as the ToC information. The wireless interface 4 notifies of a ToC message as a wireless signal, for example, periodically.

When the communication apparatus 1 operates as the subscriber, the file managing unit 22 holds a list of files reported through the ToC. Further, when a file is divided and transmitted, the file managing unit 22 holds a list of identification information of divisional data configuring a file. The file managing unit 22 compares the ToC with the file stored in the non-volatile memory 5, and determines whether or not all files described in the ToC have been received. In the present embodiment, the file managing unit 22 calls a state in which all files described in the ToC have been received as Satisfied, and the subscriber that has received all files described in the ToC is called a Satisfied subscriber. When it becomes Satisfied, the file managing unit 22 notifies the operation mode setting unit 21 of Satisfied.

When the communication apparatus 1 operates as the publisher, the message processing unit 23 generates a data message in which data (data configuring a file) held in the non-volatile memory 5 is stored. Here, an example in which the publisher transmits data held in the non-volatile memory 5 to the subscriber will be described, but the present embodiment can be applied even when data received via a wired line or a radio link or data stored in another external storage medium is transmitted.

When the communication apparatus 1 operates as the subscriber, the message processing unit 23 extracts data from the data message received from another communication apparatus 1, and stores the extracted data in the non-volatile memory 5. When the ToC is received, the message processing unit 23 notifies the file managing unit 22 of a list of files stored in the ToC (or a list of identification information of divisional data configuring a file).

Figure 12:
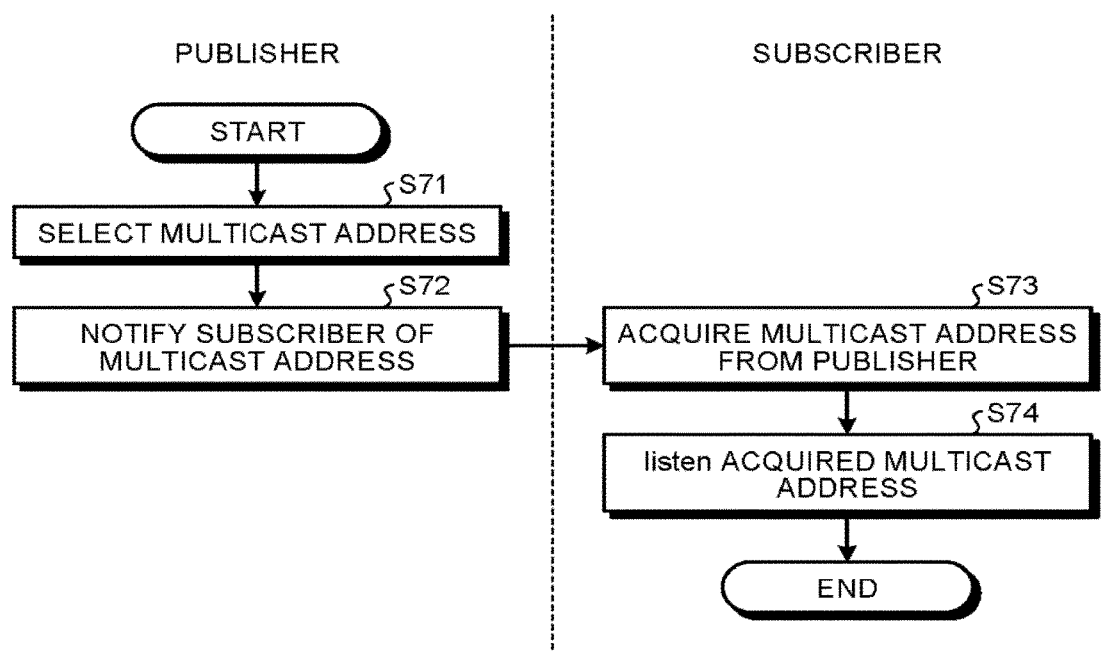
FIG. 12 is a diagram illustrating an exemplary multicast group participation process.

FIG. 12 is a diagram illustrating an exemplary multicast group participation process. When a new multicast group is created, first, the publisher selects a multicast address (step S71). The selecting of the multicast address is performed by the multicast group storage unit 3. The multicast address is used as an identifier of a multicast group that receives a file transmitted by its own apparatus. Then, the publisher notifies surrounding apparatuses of the multicast address through a certain method (step S72). For example, a method in which all the communication apparatuses 1 capable of participating in the multicast group are connected to a network space having a common network address in advance, and a notification is given to the network address in a broadcast manner is considered. Alternatively, the multicast address may be transmitted through a physical means that does not depend on a network, for example, a manager of the publisher may tell a user of the subscriber. Alternatively, instead of deciding the multicast address by the publisher, an operator may decide the multicast address and set the multicast address to the publisher, or the operator may notify the user of the multicast address through paper, an e-mail, or the like.

If the multicast address is acquired by an input from the user or reception from the publisher (step S73), when the file is received from the publisher of the multicast group, the subscriber sets the multicast address, and starts to listen (receive data transmitted within the multicast group) (step S74). Specifically, the multicast group storage unit 3 of the subscriber holds the multicast address. The multicast group storage unit 3 of the publisher also holds the decided or set multicast address.

As described above, what the subscriber participates in the multicast group, and starts to receive from the publisher is referred to as "associate" in the present embodiment. The subscriber can stop receiving data from the publisher at an arbitrary point in time. What the subscriber stops receiving data from the publisher at an arbitrary point in time is referred to as "disassociate" in the present embodiment.

When the communication apparatus 1 includes a plurality of wireless interfaces 4, one communication apparatus 1 may participate in a plurality of multicast groups at the same time. In this case, different multicast addresses are set to the respective wireless interfaces 4.

The publisher transmits the data message as described above, but transmits the following second notification signal as well. The second notification signal is the ToC message described above.

Figure 13:
FIG. 13 is a diagram illustrating an exemplary configuration of a second notification signal according to an embodiment.

FIG. 13 is a diagram illustrating an exemplary configuration of the second notification signal according to the present embodiment. The second notification signal includes a transmission source publisher identifier, a transmission destination multicast group identifier, and the ToC information (ToC Info). The second notification signal may include any other information. Transmission of the second notification signal and distribution data from the publisher and reception of the second notification signal and distribution data by the subscriber are performed after the terminal is connected to the wireless base station. The transceiving process of the first notification signal illustrated in FIG. 4 is performed in the data link layer in the OSI reference model, and the transceiving process of the second notification signal and distribution data is performed in a layer higher than the network layer.

Further, information related to the ToC message distributed by the publisher may be included in the wireless station identifier of the first notification signal of FIG. 4. For example, the bloom filter of the ID of the ToC may be included as a part of the SSID.

Figure 14:
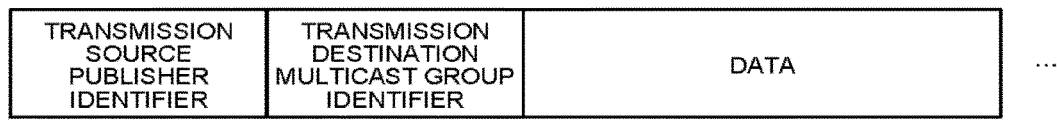
FIG. 14 is a diagram illustrating an exemplary configuration of a multicast data message.

FIG. 14 is a diagram illustrating an exemplary configuration of a multicast data message transmitted by multicast transmission. As illustrated in FIG. 14, the multicast data message stores a publisher identifier of a transmission source as information indicating the transmission source and stores a multicast group identifier of a transmission destination as information indicating a destination. Subsequently, data (data configuring a file) transmitted through this data message is stored.

Figure 15:
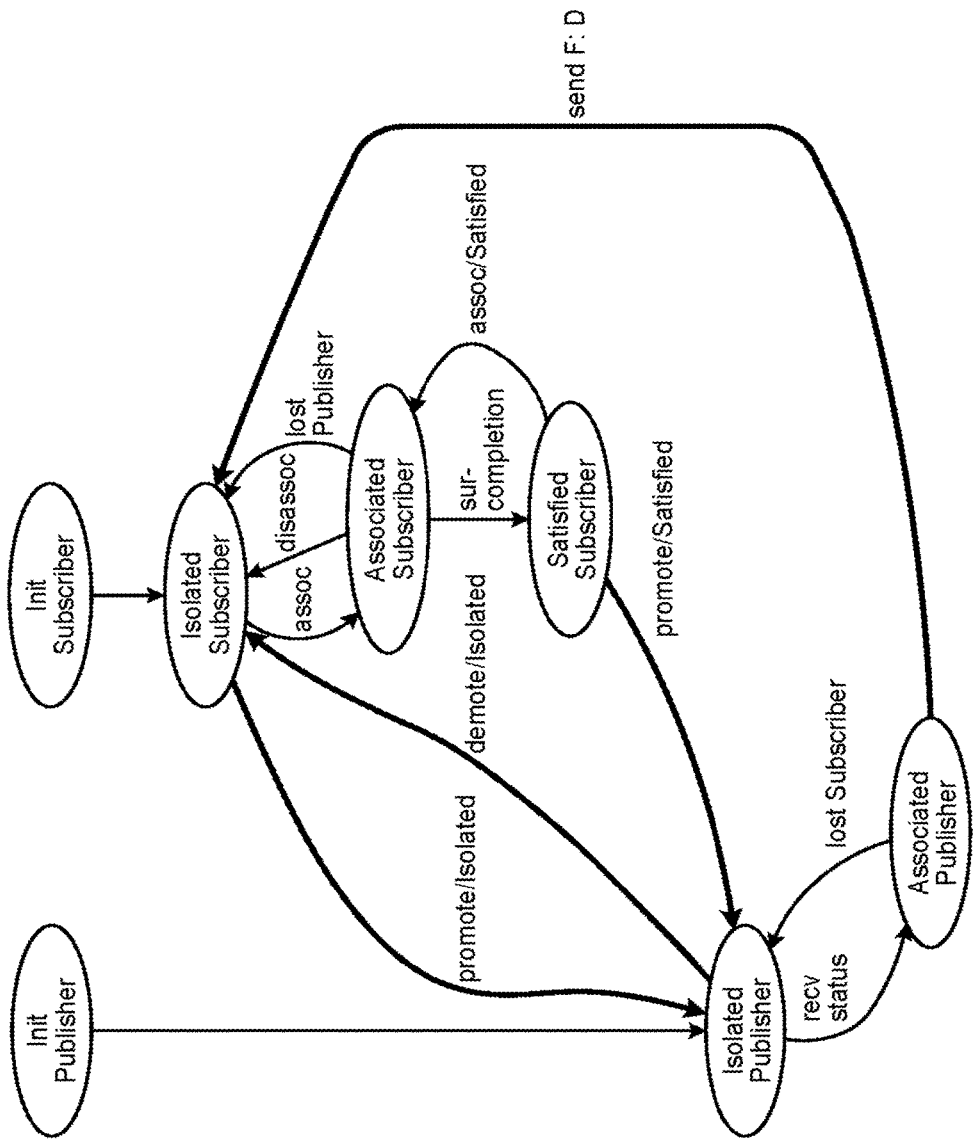
FIG. 15 is a diagram illustrating exemplary state transition according to an embodiment.

Next, state transition according to the present embodiment will be described. FIG. 15 is a diagram illustrating exemplary state transition according to the present embodiment. In an initial state, the communication apparatus 1 of the present embodiment is set as either the publisher or the subscriber for each multicast group.

For example, one or more publishers are set within the multicast group in the initial state. The subscriber that has received all data distributed by the publisher has the same information as the publisher. Thus, this subscriber can operate as the publisher as well. When this subscriber operates as the publisher, it is possible to increase a range in which data can be distributed. On the other hand, when a plurality of publishers that distribute the same data are merely located nearby, which results in congestion of radio waves, it is difficult to expect efficient data distribution. In the present embodiment, promotion from the subscriber to the publisher is possible, a restriction for promotion is set, and thus efficient data distribution is implemented while avoiding congestion of radio waves.

The terminology is now described. As the status of the communication apparatus 1 operating as the publisher, three statuses, that is, an Init publisher, an Associated publisher, and an Isolated publisher are defined. The Init publisher is a status in which the communication apparatus 1 is set as the publisher in the initial state. The communication apparatus 1 in the status of the Init publisher automatically transitions to the Isolated publisher. The Isolated publisher is a status in which there is no subscriber that receives data transmitted from the communication apparatus 1 operating as the publisher. The publisher in the status of the Isolated publisher regularly transmits the first notification signal, and regularly transmits the second notification signal. As will be described later, when data is received from the Associated publisher, the subscriber regularly transmits, for example, a status signal to the publisher. The Isolated publisher may transmit a file or may not transmit a file. Hereinafter, the communication apparatus 1 in each status is appropriately described using a status name in an abbreviated manner. For example, the communication apparatus 1 in the status of the Isolated publisher is appropriately referred to as an "Isolated publisher."

The Isolated publisher receives the status signal from the subscriber, and transitions to the Associated publisher. The Associated publisher regularly transmits the first notification signal, regularly transmits the second notification signal, and transmits the file. When the status signal has not received during a certain period of time or more (a lost subscriber), the Associated publisher determines whether or not there is any other publisher, and then transitions to the Isolated publisher when there is no any other publisher. The determination as to whether or not there is any other publisher is, for example, determination as to whether or not the second notification signal has been received from another publisher within a certain period of time.

As the status of the communication apparatus 1 operating as the subscriber, four statuses, that is, an Init subscriber, an Associated subscriber, an Isolated subscriber, and a Satisfied subscriber are defined. The Init subscriber is a status in which the communication apparatus 1 is set as the subscriber in the initial state. The Init subscriber automatically transitions to the Isolated subscriber. The Isolated subscriber is a status in which data is not received from the publisher. The subscriber in the status of the Isolated subscriber receives the second notification signal, receives data from the publisher of the transmission source of the second notification signal (participates in the multicast group corresponding to the multicast identifier stored in the second notification signal), and transitions to the Associated subscriber. The Associated subscriber receives data from the publisher, and stores the received data in the non-volatile memory 5. The Associated subscriber regularly transmits, for example, the status signal to the publisher.

The Associated subscriber can stop receiving data from the publisher at an arbitrary point in time (disassociate). The Associated subscriber transitions to the Isolated subscriber through the disassociate. When no signal has been received from the publisher during a certain period of time or more, the Associated subscriber determines that it is a status in which there is no publisher therearound, that is, a lost publisher status, and transitions to the Isolated subscriber.

The Associated subscriber holds the ToC list as described above, and determines whether or not all files included in the ToC list have been received and then stored in the non-volatile memory 5 (full satisfaction). The Satisfied subscriber is a status in which full satisfaction (sur-completion) is implemented, and the Associated subscriber transitions to the Satisfied subscriber when the full satisfaction is implemented.

The Satisfied subscriber determines whether or not it is possible to receive the second notification signal of the publisher other than the publisher that has completed the reception. It is assumed to be possible to receive the second notification signal from a publisher other than a first publisher serving as a publisher that has completed the reception. In this case, when the Satisfied subscriber is determined to have no file transmitted from a second publisher based on the ToC information stored in the second notification signal, the Satisfied subscriber may stop receiving the file from the first publisher and start receiving data from the second publisher (associate/satisfied). The details of the operation of the Satisfied subscriber will be described later.

The state transition of the subscriber and the state transition of the publisher have been described, but as indicated by a heavy line in FIG. 15, in the present embodiment, not only transition from the subscriber to the publisher but also transition from the publisher to the subscriber is possible. In the present embodiment, the transition from the subscriber to the publisher is referred to as promotion to the publisher, and the transition from the publisher to the subscriber is referred to as demotion to the subscriber. The promotion to the publisher may be performed independently of the mode switching from the above-mentioned terminal to the wireless base station.

The publisher may be demoted to the Isolated subscriber at an arbitrary timing. For example, the publisher may be demoted, for example, when the battery level of the communication apparatus 1 is low or when it is difficult to continuously transmit data. When the Associated publisher is demoted, a notification of the demotion is given. For example, the second notification signal may be provided with a region storing a flag for notifying of the demotion, and the Associated publisher may set D (demotion) to the flag and transmit the second notification signal. When the Isolated publisher is demoted, since there is no subscriber that receives data, the notification of the demotion may be given or may not be given.

As an example of the promotion, two examples, that is, promotion from the Satisfied subscriber and promotion from the Isolated subscriber are considered. As a condition of the promotion from the Isolated subscriber, for example, a condition in which the promotion is performed when there is no publisher therearound may be set, but the condition of the promotion from the Isolated subscriber is not limited thereto. A condition of the promotion from the Satisfied subscriber to the publisher is not particularly limited, but the promotion to the publisher may be performed, for example, when the same condition as the mode switching from the above-mentioned terminal to the wireless base station is satisfied.

As described above, in the present embodiment the terminal does not perform the mode switching to the wireless base station when the first communication quality with the first wireless base station serving as the wireless base station being connected thereto is equal to or larger than the first threshold value. Further, the terminal switches the operation mode to the wireless base station when the first communication quality is less than the first threshold value, and it is difficult to receive the signal from the second wireless base station other than the wireless base station being connected thereto. Moreover, when the first communication quality is less than the first threshold value, but it is possible to receive the signal from the second wireless base station, if the second communication quality with the second wireless base station is equal to or larger than the second threshold value, the terminal does not switch the operation mode to the wireless base station. When the first communication quality is less than the first threshold value, and it is possible to receive the signal from the second wireless base station, if the second communication quality with the second wireless base station is less than the second threshold value, the determination of the presence or absence of the second wireless base station is repeated again. Thus, the terminal that has received all data can switch the operation mode to the wireless base station autonomously and rapidly and can avoid congestion of radio waves by preventing the terminal close to the wireless base station from operating as the wireless base station. Particularly, when the wireless base station operates as the publisher, it is possible to prevent many publishers from performing data delivery in the multicast manner by preventing a situation in which there are many wireless base stations within a close range, and thus an effect in which congestion of radio waves is suppressed is profound.

The communication apparatus 1 can prevent interference and perform data transmission by selecting a channel in which the maximum communication quality $R_{ch\_max}[k]$ has the smallest value based on the channel scan result for N channels before performing the mode switching from the terminal mode to the wireless base station mode and performing switching to the selected channel. Further, the channel scan is performed on some channels, for example, N channels rather than all available channels, and thus it is possible to reduce a time required for the channel scan.

Further, when the first communication quality is less than the first threshold value, after being on standby during the first switching standby time generated based on the first communication quality, it is determined whether or not it is possible to receive the signal from the second wireless base station. As a result, the terminal that is far from the wireless base station can perform the transition of the operation mode to the wireless base station early. Further, when the second communication quality is less than the second threshold value, after being on standby during the second switching standby time generated based on the second communication quality, the second wireless base station is searched for again. Thus, the terminal that is far from the wireless base station that has switched the mode from the terminal can perform the transition of the operation mode to the wireless base station early.

Next, a second embodiment will be described. The communication apparatus 1 of the present embodiment has a similar configuration as in the first embodiment. Components having the same functions as in the first embodiment are denoted by the same reference numerals as in the first embodiment, and thus a duplicated description thereof is omitted.

In the present embodiment, a method of preventing an approaching communication apparatus 1 from transitioning to the wireless base station mode using the same channel after switching from the terminal mode to the wireless base station mode is performed in the processes illustrated in FIGS. 6 and 8 in the first embodiment will be described. As described in the first embodiment, a plurality of communication apparatuses 1 are prevented from transitioning to the wireless base station mode at the same time through the standby operations of the first switching standby time and the second switching standby time. However, nevertheless, the approaching communication apparatus 1 is considered to start communication in the wireless base station mode using the same channel.

Figure 16:
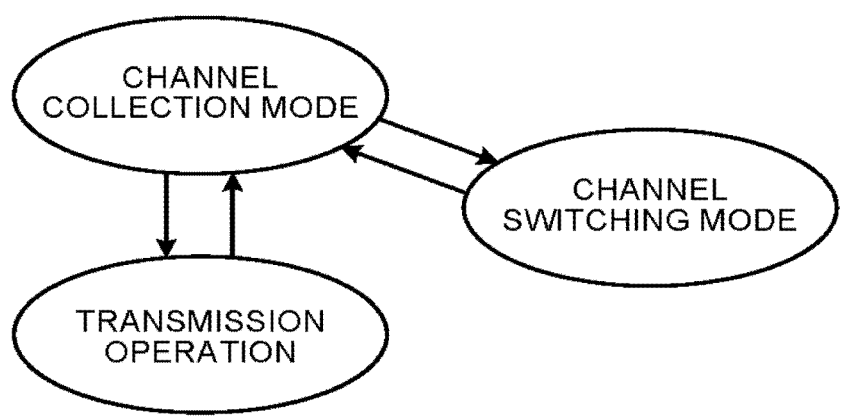
FIG. 16 is a diagram illustrating exemplary mode transition after switching to a wireless base station mode is performed.

In the present embodiment, in order to prevent the approaching communication apparatus 1 from using the same channel, the communication apparatus 1 transitions to a channel collection mode after performing switching from the terminal mode to the wireless base station mode, that is, starting the operation in the wireless base station mode. In the channel collection mode, the communication apparatus 1 performs a channel collection process described below. FIG. 16 is a diagram illustrating exemplary mode transition after switching to the wireless base station mode is performed. As illustrated in FIG. 16, after switching to the wireless base station mode is performed, transition to the channel collection mode is performed. Through the channel collection process (which will be described below) performed in the channel collection mode, when the maximum value of the communication quality in a channel scheduled for use, that is a switched channel is equal to or less than a threshold value, the communication apparatus 1 starts a transmission operation using the channel. The transmission operation is transmission of the first notification signal of the wireless base station or any other signal, and includes file delivery when it operates as the publisher as well. Through the channel collection process, when the maximum value of the communication quality of the switched channel is larger than the threshold value, transition to a channel switching mode is performed. The channel switching mode refers to a mode in which the channel selection and switching process described in the first embodiment is performed. The communication apparatus 1 transitions to the channel collection mode when the channel selection and switching process is performed in the channel switching mode.

Figure 17:
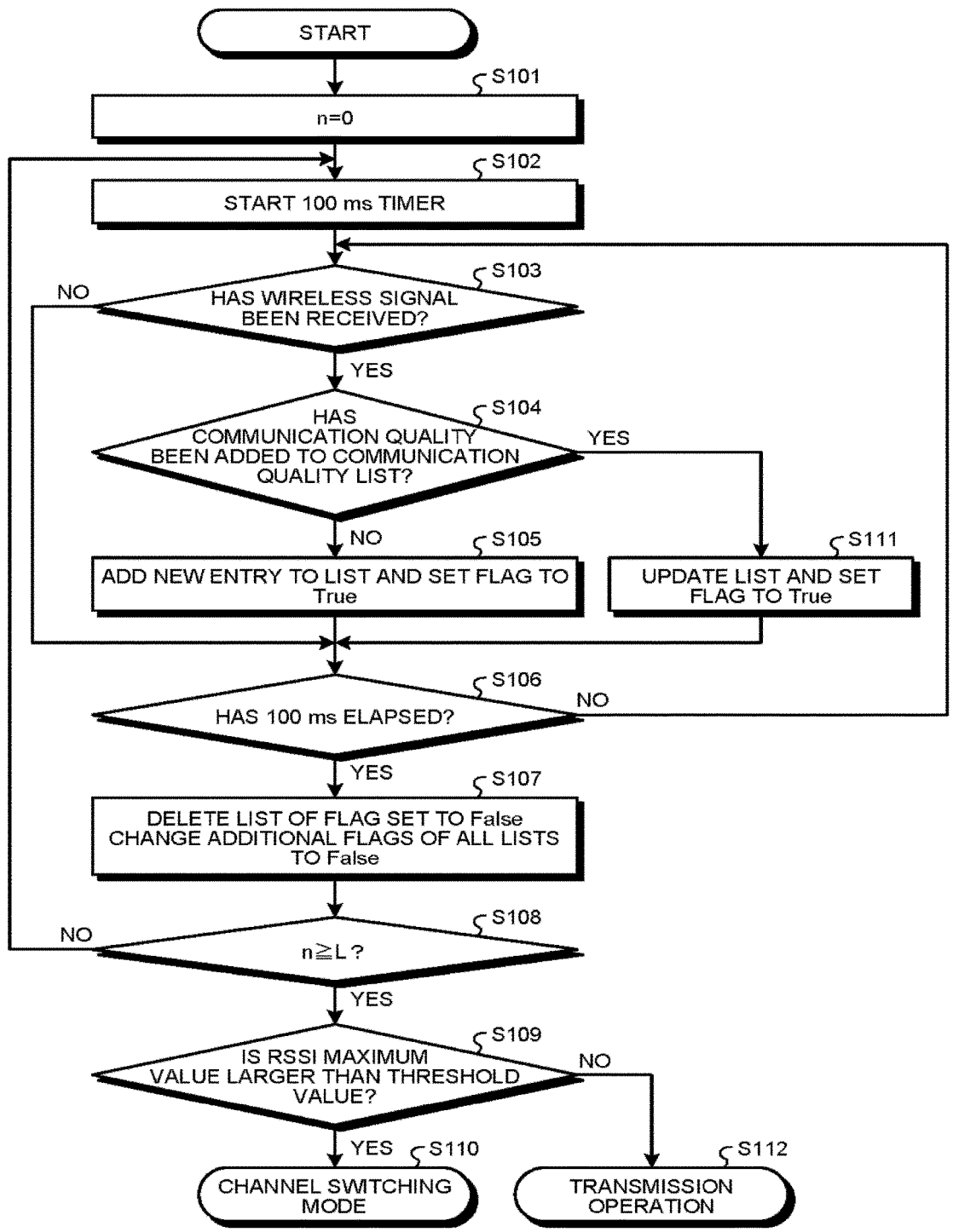
FIG. 17 is a flowchart illustrating an exemplary a channel collection process.

FIG. 17 is a flowchart illustrating an exemplary channel collection process. The operation mode setting unit 21 initializes n to 0, where n is a variable indicating the number of measurements of 100 ms using a 100 ms timer whose expiry period is 100 ms (step S101). Then, the operation mode setting unit 21 starts measurement by the 100 ms timer (step S102). The operation mode setting unit 21 instructs the communication quality measuring unit 24 to acquire the communication quality in a currently set channel. The communication quality measuring unit 24 determines whether or not a wireless signal transmitted from another communication apparatus has been received through the wireless interface 4 and the message processing unit 23 (step S103). When the wireless signal has been received (Yes in step S103), the communication quality measuring unit 24 acquires the communication quality based on the wireless signal, and notifies the operation mode setting unit 21 of the communication quality and the wireless station identifier extracted from the wireless signal. The beacon frame such as the first notification signal may be used as the wireless signal received from another communication apparatus. Further, when it is possible to set a promiscuous mode serving as a mode in which all data can be received, the promiscuous mode may be set, and a data frame may be used as the wireless signal. The operation mode setting unit 21 determines whether or not the communication quality corresponding to the wireless station identifier has been added to the communication quality list based on the notification of the wireless station identifier (step S104). At this time, the communication quality list is similar to the communication quality list described in the first embodiment. In the channel collection process, the communication quality of the currently set channel rather than N channels is stored.

When the communication quality corresponding to the notified wireless station identifier has not been added to the communication quality list (No in step S104), the operation mode setting unit 21 adds a new entry of the communication quality list, and sets the flag to True (step S105). On the other hand, when the communication quality corresponding to the notified wireless station identifier has been added to the communication quality list (Yes in step S104), the operation mode setting unit 21 updates the corresponding entry of the communication quality list, and sets the flag to True (step S111).

After step S105 and step S111, the operation mode setting unit 21 determines whether or not 100 ms has elapsed, that is, the 100 ms timer has expired (step S106). When 100 ms has elapsed (Yes in step S106), the operation mode setting unit 21 deletes an entry in which the flag is set to False from the communication quality list, changes the flags of the remaining entries in the communication quality list to False, and increases n by one (1) (step S107). Then, the operation mode setting unit 21 determines whether or not n is L or more (step S108). L is a value indicating an upper limit of a count number of an elapsed time of 100 ms, and refers to an integer value generated by a random number. In other words, L×100 ms is a transmission standby time. For example, L may be generated by a random number based on the communication quality, similarly to the first switching standby time.

When n is L or more (Yes in step S108), it is determined whether or not the maximum value of the communication quality of the communication quality list is larger than a threshold value (step S109). When the maximum value of the communication quality of the communication quality list is larger than the threshold value (Yes in step S109), the operation mode setting unit 21 transitions to the channel switching mode (step S110), that is, performs the channel selection and switching process. When the maximum value of the communication quality of the communication quality list is equal to or less than the threshold value (No in step S109), the transmission operation as the wireless base station starts using the currently set channel (step S112).

When 100 ms has not elapsed in step S106 (No in step S106), the process returns to step S103. When n is less than L in step S108 (No in step S108), the process returns to step S102. When no wireless signal has been received (No in step S103), the process proceeds to step S106. The remaining operation in the present embodiment is the same as in the first embodiment.

As described above, in the present embodiment, the communication apparatus 1 monitors the presence or absence of the signal transmitted from another communication apparatus during a time generated by a random number after switching the channel and switching the mode from the terminal mode to the wireless base station mode, and performs the transmission operation using the set channel when the maximum value of the communication quality of the signal transmitted from another communication apparatus, that is, the maximum value of reception strength is equal to or less than the threshold value. Further, when the communication quality of the signal transmitted from another communication apparatus is larger than the threshold value, the channel is switched. Thus, the same effect as in the first embodiment can be obtained while preventing competition of channels.

Third Embodiment

Next, a third embodiment will be described. The communication apparatus 1 of the present embodiment has a similar configuration as in the first embodiment. Components having the same functions as in the first embodiment are denoted by the same reference numerals as in the first embodiment, and thus a duplicated description thereof is omitted.

In the second embodiment, when the communication apparatus 1 switches the operation mode from the terminal mode to the wireless base station mode, the communication apparatus 1 monitors the presence or absence of the signal transmitted from another communication apparatus, and changes the channel when the channel of the communication apparatus 1 competes with that of another communication apparatus. On the other hand, the operation starts in the wireless base station mode, and when a time passes, a wireless environment may be changed due to movement of the communication apparatus 1 or the like. For this reason, in the present embodiment, when a transition condition is satisfied during the operation in the wireless base station mode, transition to channel monitoring mode is performed. As the transition condition, for example, a condition in which a certain period of time elapses (that is, transition to the channel monitoring mode is regularly performed), or a condition in which file delivery is completed, or the like may be used.

Figure 18:
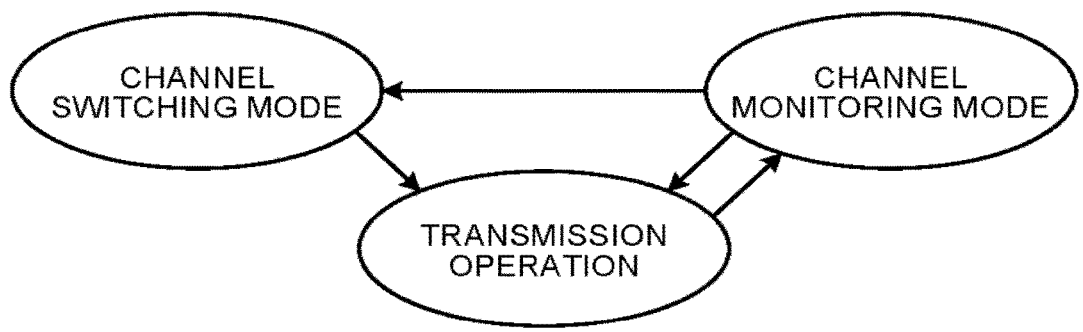
FIG. 18 is a diagram illustrating a mode transition diagram according to a third embodiment.

FIG. 18 is a diagram illustrating an exemplary mode transition diagram according to the present embodiment. In the present embodiment, as illustrated in FIG. 18, when the transmission operation is performed in the wireless base station mode, the communication apparatus 1 transitions to the channel monitoring mode if the transition condition is satisfied. In the channel monitoring mode, the communication apparatus 1 performs a channel monitoring process which will be described later, and transitions to the channel switching mode when the communication quality of the signal transmitted from another communication apparatus in the channel being used by the channel monitoring process is determined to be larger than the threshold value. The channel switching mode is a mode in which the channel selection and switching process is performed as described in the second embodiment. The communication apparatus 1 resumes the transmission operation when the channel selection and switching process is performed in the channel switching mode. The communication apparatus 1 resumes the transmission operation when the communication quality of the signal transmitted from another communication apparatus in the channel being used by the channel monitoring process in the channel monitoring mode is determined to be equal to or less than the threshold value.

Figure 19:
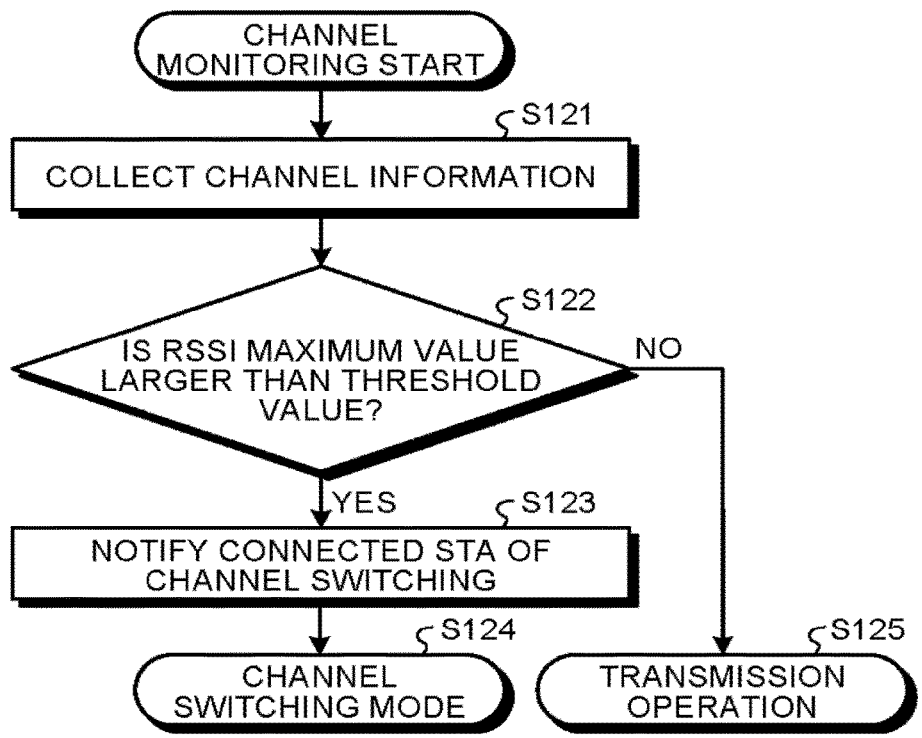
FIG. 19 is a diagram illustrating an exemplary channel monitoring process.

FIG. 19 is a diagram illustrating an exemplary channel monitoring process. As illustrated in FIG. 19, the operation mode setting unit 21 instructs the communication quality measuring unit 24 to acquire the communication quality in the currently set channel. The communication quality measuring unit 24 collects channel information of the channel through the wireless interface 4 and the message processing unit 23 (step S121). Specifically, the communication quality measuring unit 24 acquires the communication quality based on the wireless signal received from another communication apparatus during a certain period of time. As the wireless signal received from another communication apparatus, similarly to the second embodiment, the beacon frame such as the first notification signal may be used, or the promiscuous mode may be set, and the data frame may be used. The communication quality measuring unit 24 notifies the operation mode setting unit 1 of the measured communication quality.

The communication quality measuring unit 24 obtains the maximum value of the communication quality, and determines whether or not the maximum value of the communication quality is larger than a threshold value (step S122). When the maximum value of the communication quality is larger than the threshold value (Yes in step S122), the operation mode setting unit 21 transmits a channel switching notification indicating that the channel is switched through the wireless interface 4 (step S123), and transitions to the channel switching mode, that is, performs the channel selection and switching process (step S124). A destination of the channel switching notification is a multicast address. The destination of the channel switching notification may be a broadcast address. After the channel selection and switching process, the transmission operation is resumed using the switched channel. When the maximum value of the communication quality is equal to or less than the threshold value (No in step S122), the channel is not switched, the process proceeds to step S125, the transmission operation as the wireless base station starts (step S125).

Upon receiving the channel switching notification, the terminal (the communication apparatus 1 operating as the terminal) being connected with the wireless base station (the communication apparatus 1 operating as the wireless base station) performs the channel scan, and searches for the switched channel of the wireless base station. Since the wireless base station transmits the first notification signal after the channel switching*f the terminal can receive the first notification signal and detect the switched channel of the wireless base station. Upon detecting the switched channel of the wireless base station, the terminal performs reception through the detected channel. After the switching mode (step S124), the wireless base station may notify the terminal of the switched channel, and the terminal may switch the channel based on the notification.

The remaining operation in the present embodiment is the same as the operation in the first embodiment. Further, when the operation in the second embodiment is performed, the operation described in the present embodiment may be performed.

As described above, in the present embodiment, when the transition condition is satisfied while the communication apparatus 1 is operating in the wireless base station mode, the communication apparatus 1 transitions to the channel monitoring mode, and when the communication quality of the signal transmitted from another communication apparatus in the channel monitoring mode, that is, the maximum value of the reception strength is larger than the threshold value, the communication apparatus 1 performs the channel selection and switching process. Thus, the same effect as in the first embodiment can be obtained, and competition of channels can be prevented even when the wireless environment is changed after the operation in the wireless base station mode.

Fourth Embodiment

Figure 20:
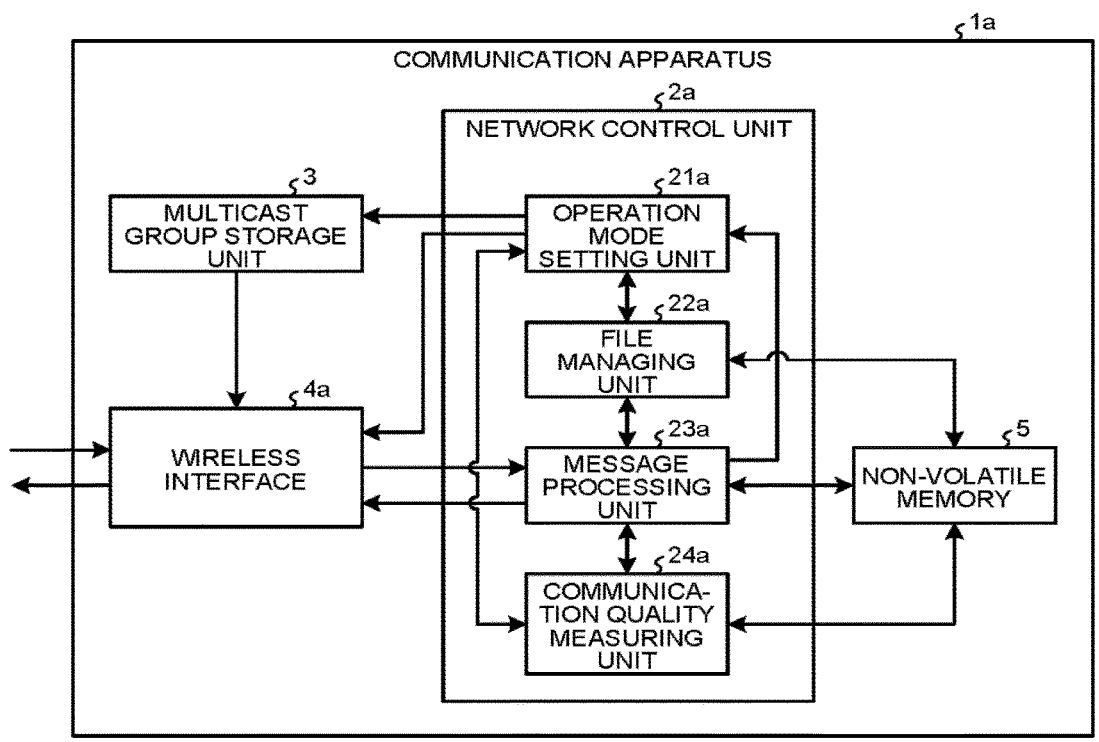
FIG. 20 is a diagram illustrating an exemplary configuration of a communication apparatus according to a fourth embodiment.

FIG. 20 is a diagram illustrating an exemplary configuration of a communication apparatus 1a according to a fourth embodiment. As illustrated in FIG. 17, the communication apparatus 1a of the present embodiment has a similar configuration to the communication apparatus 1 of the first embodiment except that a wireless interface 4a and a network control unit 2a are provided instead of the wireless interface 4 and the network control unit 2, respectively. Components having the same functions as in the first embodiment are denoted by the same reference numerals as in the first embodiment, and thus a duplicated description thereof is omitted.

The first embodiment has been described in connection with the example in which the number of modes that can be simultaneously set by the communication apparatus 1 is one (1), and any one of the wireless base station mode and the terminal mode is set. The present embodiment will be described in connection with an example in which a plurality of modes can be simultaneously set. The setting of a plurality of modes indicates that a plurality of modes are set respectively, and a plurality of operations according to the set modes can be simultaneously executed. The simultaneous execution of the operations mentioned herein includes a case in which operations of a plurality of modes are performed in a time division manner. When a plurality of modes can be simultaneously set, for example, it is possible to receive delivery of a file through the operation in the terminal mode while delivering another file to another communication apparatus in the wireless base station mode. In this case, it is possible to share a file among many communication apparatuses at a higher speed than in the first embodiment. Moreover, operations can be performed in two terminal modes, and it is possible to receive a file in one terminal mode while executing the channel scan or receiving a file through another channel in the other terminal mode.

The network control unit 2a includes an operation mode setting unit 21a, a file managing unit 22a, a message processing unit 23a, and a communication quality measuring unit 24a. Each of the operation mode setting unit 21a, the file managing unit 22a, the message processing unit 23a, and the communication quality measuring unit 24a can simultaneously perform operations of a plurality of operation modes.

As an example of the wireless interface 4a of the communication apparatus 1a, for example, a wireless interface that supports the concurrent mode of the wireless LAN may be used. In this case, when the wireless interface 4a is set to the concurrent mode, operations of a plurality of operation modes can be simultaneously implemented. The operation of the communication apparatus 1a is similar to those in the first to third embodiments except for points described below.

Figure 21:
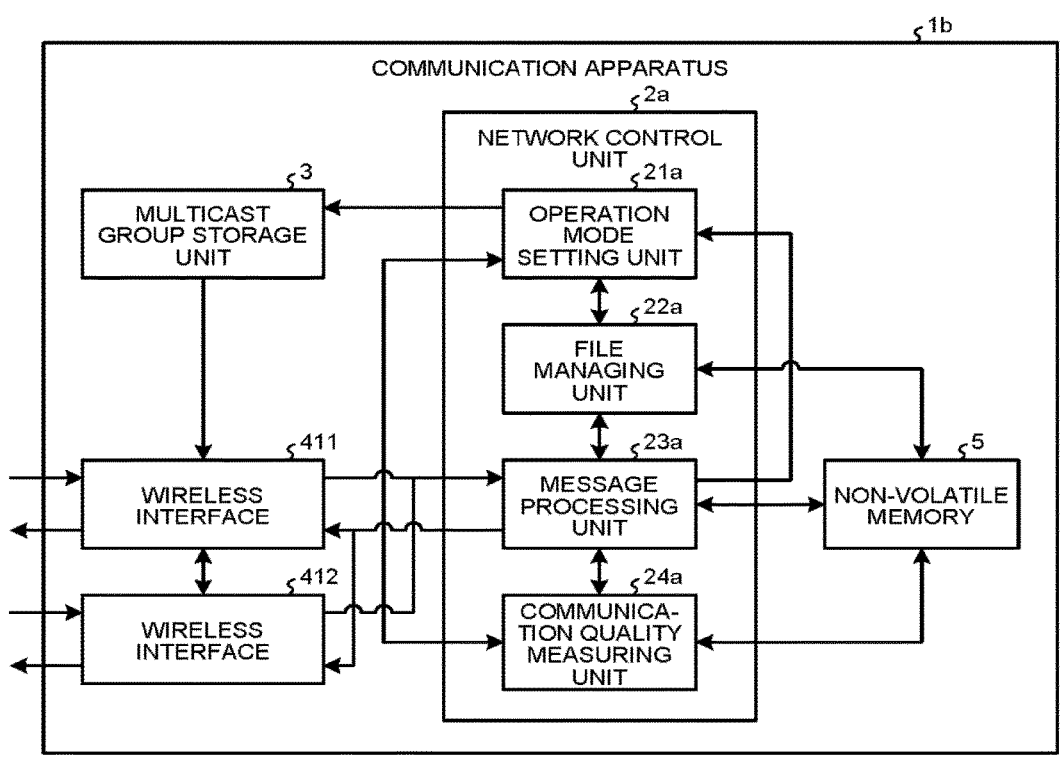
FIG. 21 is a diagram illustrating an exemplary configuration of a communication apparatus including a plurality of wireless interfaces.

As illustrated in FIG. 21, a plurality of wireless interfaces may be provided to implement operations of a plurality of operation modes simultaneously. In FIG. 21, two wireless interfaces, that is, wireless interfaces 411 and 412 are provided, but three or more wireless interfaces may be provided. A communication apparatus 1b illustrated in FIG. 21 includes the wireless interfaces 411 and 412, and includes the same network control unit 2a as in the communication apparatus 1a illustrated in FIG. 20.

The communication apparatus 1a or the communication apparatus 1b of the present embodiment can perform a channel scan at the same time when a certain operation mode is set, and the operation is being performed as described above. For example, when the terminal mode is set as a first mode, and the operation is performed, the channel scan is simultaneously performed by the operation of the second terminal mode to collect the communication quality while data (a file) is being received, and the communication quality list is created. In this case, when reception of all data is completed in one mode, and the processes of FIGS. 6 and 8 are performed, step S26 and step S46 need not be performed, and thus the mode switching can be performed at a higher speed than in the first embodiment.

Similarly, in the above-mentioned channel monitoring mode, when the number of operation modes which can be set is one (1), transitions from the wireless base station mode to the terminal mode is temporarily performed when the channel scan is performed. Thus, when a file is delivered in the wireless base station mode, it is necessary to temporarily suspend the file delivery. On the other hand, when the communication apparatuses 1a and 1b illustrated in FIGS. 20 and 21 are used, it is possible to perform the operation of the terminal mode while keeping the wireless base station mode, and thus it is unnecessary to suspend the file delivery.

As described above, in the present embodiment, the communication apparatus has a configuration capable of simultaneously performing a plurality of operation modes. Thus, the effect of the first embodiment can be obtained, and the mode switching can be performed at a higher speed than in the first embodiment. Moreover, the channel scan can be performed during the file delivery without suspending the file delivery.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication apparatus capable of performing communication with an external wireless base station, the communication apparatus comprising:
   a wireless interface that performs transmission/reception a message to/from outside the communication apparatus, the wireless interface circuit having a function of switching two or more frequency channels;
   an operation mode memory that stores an operation mode indicating a mode in which the communication apparatus operates as a wireless base station or a mode in which the communication apparatus operates as a terminal;
   an identification information memory that stores a first identifier indicating that the communication apparatus belongs to a first group;
   a message processor that generates a message that is transmitted through the wireless interface circuit and analyze a message that is received through the wireless interface circuit; and
   a non-volatile memory,
   wherein when the communication apparatus is the wireless base station based on the operation mode stored in the operation mode memory, a transmission message is output to the outside of the communication apparatus through the wireless interface, the transmission message including ToC information, the ToC information including the first identifiers and a list of data to be transmitted,
   when the communication apparatus is the terminal based on the operation mode stored in the operation mode memory, data included in a reception message from a first wireless base station received by the wireless interface is stored in the non-volatile memory if the first identifier is included in the reception message,
   when the communication apparatus operates as the terminal, after all data corresponding to the ToC information are already received, if a communication quality with the first wireless base station is less than a first threshold value, and no message is received from a wireless base station other than the first wireless base station, the communication apparatus performs a channel selection and switching process, the operation mode is changed from the terminal to the wireless base station after the channel selection and switching process,
   the channel selection and switching process is a process of selecting one of a plurality of frequency channels and causing the wireless interface to perform transmission and reception of the message through the selected frequency channel,
   value of the communication quality becomes higher as quality of communication is higher, and
   in the channel selection and switching process, when the maximum values of the communication qualities are equal, the frequency channel is selected according to an order that is determined in advance.

2. The communication apparatus according to claim 1, wherein when the communication quality with the first wireless base station is less than a predetermined value, after a standby operation of a first switching standby time, a communication quality is acquired while switching the frequency channel, and after communication quality acquisition for all the frequency channels is completed, when no message is received from the wireless base station other than the first wireless base station, the operation mode is changed from the terminal to the wireless base station.

3. The communication apparatus according to claim 1, wherein the channel selection and switching process is a process of acquiring maximum values of the communication qualities of the plurality of frequency channels and selecting a frequency channel in which the maximum value of the communication quality is smallest among the plurality of frequency channels.

4. The communication apparatus according to claim 1, wherein after a standby is performed during a transmission standby time after the operation mode is changed from the terminal to the wireless base station, transmission using the selected frequency channel starts.

5. The communication apparatus according to claim 1, wherein after the operation mode is changed from the terminal to the wireless base station, when a maximum value of the communication quality of the selected frequency channel is larger than a threshold value, the channel selection and switching process is performed again.

6. The communication apparatus according to claim 1, wherein the communication quality is received signal strength indication.

7. The communication apparatus according to claim 1, wherein the communication quality is reception power of a wireless signal.

8. The communication apparatus according to claim 1, wherein the communication quality is a signal to noise power ratio.

9. The communication apparatus according to claim 1, wherein the communication quality is a signal to noise power ratio.

10. The communication apparatus according to claim 1, wherein the communication quality is based on a packet error rate.

11. The communication apparatus according to claim 2, wherein the first switching standby time is generated based on a first communication quality serving as a communication quality of the first wireless base station.

12. The communication apparatus according to claim 2, wherein when the communication quality with the first wireless base station is less than the predetermined value, and a message is received from a second wireless base station serving as the wireless base station other than the first wireless base station, a second communication quality serving as a communication quality with the second wireless base station is obtained, it is determined again whether or not a condition in which the message is not received from the second wireless base station is satisfied when a maximum value of the second communication quality is less than a second threshold value, the channel selection and switching process is performed when the condition is satisfied, and after the channel selection and switching process, the operation mode is changed from the terminal to the wireless base station.

13. The communication apparatus according to claim 4, wherein the transmission standby time is generated based on the communication quality of the selected frequency channel.

14. The communication apparatus according to claim 12, wherein when the maximum value of the second communication quality is less than the second threshold value, it is determined whether or not the condition is satisfied after a standby operation of a second switching standby time.

15. The communication apparatus according to claim 14, wherein the second switching standby time is generated based on the second communication quality.

16. A communication method in a communication apparatus including a non-volatile memory, comprising:
- storing a mode in which the communication apparatus operates as a wireless base station or a mode in which the communication apparatus operates as a terminal;
- storing a first identifier indicating that the communication apparatus belongs to a first group;
- outputting a transmission message to an outside of the communication apparatus when the communication apparatus is determined to be the wireless base station based on the stored mode, the transmission message including ToC information, the ToC information including the first identifiers and a list of data to be transmitted;
- storing data included in a reception message received from a first wireless base station in the non-volatile memory when the communication apparatus is determined to be the terminal based on the stored mode and the first identifier is included in the reception message; and
- when the communication apparatus operates as the terminal, after all data corresponding to the ToC information are already received, if a communication quality with the first wireless base station is less than a first threshold value, and no message is received from a wireless base station other than the first wireless base station, performing a channel selection and switching process, and changing the operation mode from the terminal to the wireless base station after the channel selection and switching process, the channel selection and switching process selecting one of a plurality of frequency channels, wherein the channel selection and switching process is a process of switching a frequency channel for transmitting the transmission message to the selected frequency channel, value of the communication quality becomes higher as quality of communication is higher, and in the channel selection and switching process, when the maximum values of the communication qualities are equal, the frequency channel is selected according to an order that is determined in advance.

* * * * *